(12) United States Patent
Parthasarathy et al.

(10) Patent No.: US 8,015,542 B1
(45) Date of Patent: Sep. 6, 2011

(54) SYSTEM AND METHOD FOR CREATING A GRAPHICAL PROGRAM WHICH INVOKES METHODS AND PROPERTIES OF OBJECTS

(75) Inventors: Murali Parthasarathy, Austin, TX (US); Omid Sojoodi, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/466,275

(22) Filed: Dec. 17, 1999

Related U.S. Application Data

(60) Division of application No. 08/810,079, filed on Mar. 4, 1997, now Pat. No. 6,064,812, which is a continuation-in-part of application No. 08/717,771, filed on Sep. 23, 1996.

(51) Int. Cl.
*G06F 9/45* (2006.01)
(52) U.S. Cl. ..................................... 717/105
(58) Field of Classification Search .............. 717/105, 717/108, 109, 149
See application file for complete search history.

(56) References Cited

U.S. PATENT DOCUMENTS

| | | | | |
|---|---|---|---|---|
| 4,901,221 A | | 2/1990 | Kodosky et al. | 345/771 |
| 5,255,363 A | * | 10/1993 | Seyler | 345/856 |
| 5,261,043 A | | 11/1993 | Wolber et al. | 345/763 |
| 5,428,776 A | | 6/1995 | Rothfield | 707/4 |
| 5,481,741 A | | 1/1996 | McKaskle et al. | 345/522 |
| 5,576,946 A | | 11/1996 | Bender et al. | 700/17 |
| 5,640,572 A | | 6/1997 | Mondrik et al. | 702/186 |
| 5,727,175 A | | 3/1998 | Malone et al. | 345/356 |
| 5,768,578 A | | 6/1998 | Kirk et al. | 707/100 |
| 5,778,227 A | * | 7/1998 | Jordan | 707/101 |
| 5,784,583 A | | 7/1998 | Redpath | 345/353 |
| 5,847,953 A | | 12/1998 | Sojoodi et al. | 345/736 |
| 5,848,273 A | * | 12/1998 | Fontana et al. | 707/100 |
| 5,850,548 A | | 12/1998 | Williams | |
| 5,940,296 A | * | 8/1999 | Meyer | 700/83 |
| 5,991,535 A | * | 11/1999 | Fowlow et al. | 717/107 |
| 6,038,395 A | * | 3/2000 | Chow et al. | 717/105 |
| 6,064,812 A | * | 5/2000 | Parthasarathy et al. | 717/105 |
| 6,064,816 A | | 5/2000 | Parthasarathy et al. | 703/21 |
| 6,154,875 A | * | 11/2000 | Tanaka et al. | 717/107 |
| 6,219,826 B1 | * | 4/2001 | De Pauw et al. | 709/315 |

(Continued)

OTHER PUBLICATIONS

Wyant, Intorducing Modulo-3 . . . , 1994, ACM, p. 1-8.*

(Continued)

*Primary Examiner* — John Chavis
(74) *Attorney, Agent, or Firm* — Meyertons Hood Kivlin Kowert & Goetzel, P.C.; Jeffrey C. Hood

(57) ABSTRACT

A method for developing an automation client program in a graphical programming environment is disclosed. The graphical programming environment provides a set of automation nodes and controls which may be dropped and wired together to create a graphical program. The nodes include an automation refnum which references a user-selected automation class from an automation type library; an automation open node which instantiates an object from the selected automation class; an automation invoke node which invokes a user-selected method of the automation class; and an automation property node which invokes, i.e., reads or writes, user-selected properties of the automation class. The nodes enable the displaying, manipulating, cataloging, editing or performance other operations, such as may be performed by an automation server, on data acquired or generated by a virtual instrument. A method for performing class propagation and type propagation checking of automation objects in a graphical program is also disclosed.

82 Claims, 31 Drawing Sheets

U.S. PATENT DOCUMENTS 6,286,017 B1 * 9/2001 Egilsson ..................... 707/503
2002/0010713 A1 * 1/2002 Egilsson ..................... 707/504

OTHER PUBLICATIONS

Pleas, K., BYTE Magazine Special Report, Apr. 1996, "OLE's Missing Links: An emerging standard for communication between applications, OLE 2 will work better when software vendors agree on its meaning," 6 pages.
Linthicum, D., BYTE Magazine State of the Art, Jan. 1996, "Integration, Not Perspiration: CORBA, OLE, and OpenDoc: Three technologies for desktop components face off," 11 pages.
Smedley, Trevor J., "Visual Programming Applied to Industrial Software Development", 1995, pp. 2-28.
LabVIEW Function Reference Manual, Aug. 1993 Edition, pp. 10-11 and 10-12.
LabVIEW Code Interface Reference Manual, Dec. 1993.
Labview Function Reference Manual, "Call Library Function," Sep. 1994, pp. 10-3 and 10-4.
Labview Function On-Line Help Manual, "Call Library Function Node," Sep. 1994, 14 pages.
"HP VEE Reference" manual, Edition 3, Sep. 1993, 686 pgs.
"How to Use HP VEE" manual, Edition 1, Jan. 1995, 302 pgs.
"HP VEE Reference" manual, Edition 4, Jan. 1995, 771 pgs.
Robert Helsel, "Cutting Your Test Development Time with HP VEE", 1994, 444 pgs.
"HP VEE Advanced Programming Techniques", Edition 4, May 1998, 376 pgs.
Robert Helsel, "Graphical Programming A Tutorial for HP VEE", 1995, 429 pgs.
"HP VEE 3.0 The Most Productive Language for Test & Measurement", 1995, 23 pgs.
"HP VEE 4.0 Visual Programming Language", 1995, 70 pgs.
Bitterer et al. "Visual Age and Transaction Processing in a Client/Server Environment", 1996, 369 pgs.
Developing Distributed Object Applications with VisualAge Smalltalk and SOMobjects, Feb. 1996, 251 pgs.
Stewart McKie, "DBMS—The IBM Enterprise", Apr. 1996, 8 pgs.
Dan Rogers, VisualAge C++ 3.5 for Windows, Oct. 1996, 6 pgs.
Fang et al., "VisualAge for Smalltalk and SOMobjects, Developing Distributed Object Applications", 1997, 305 pgs.
Marc Carrel-Billiard et al., "Programming with VisualAge for C++ for Windows", 1997, 598 pgs.
VisualAge for Smalltalk User's Reference, Version 3, Release 0, Third Edition Nov. 1995, 529 pgs.
"LabVIEW for Windows, User Manual", Dec. 1993, 434 pgs.
"LabVIEW Code Interface Reference Manual", Dec. 1993, 249 pgs.
"LabVIEW Code Interface Reference Manual", Sep. 1994, 266 pgs.
"LabVIEW Code Interface Reference Manual", Jan. 1996, 163 pgs.
"LabVIEW Networking Reference Manual", Dec. 1993, 85 pgs.
"LabVIEW Networking Reference Manual", Sep. 1994, 145 pgs.
"LabVIEW Communications VI Reference Manual", Jan. 1996 Edition, 166 pgs.
"LabVIEW for Tutorial", Aug. 1993, 204 pgs.
"LabVIEW for Windows Tutorial", Sep. 1994, 230 pgs.
"LabVIEW Tutorial Manual", Jan. 1996 Edition, 246 pgs.
"LabVIEW Utility Reference Manual" Nov. 1992, 66 pgs.
"Dr. Dobb's Journal", 1994, 7 pgs. Plus Joseph Firmage, Novell's App Ware Distributed Bus Extending a Powerful Event Engine Across the Network, 1994, 11 pgs.
Rijinders et al., "Versatile Visual Programming Environment for Scientific Applications", 1991, 6 pgs.
"Software Reviews", vol. 8, Sep. 1993, 16 pgs.
"Icon Author Reference Manual", Version 7.0, Nov. 1995, 601 pgs.
"Icon Author User Manual", Version 7.0, Nov. 1995, 382 pgs.
"Icon Author Getting Started", Version 7.0, Nov. 1995, 205 pgs.
"Max and Programming", No Date, 12 pgs.
"IRCAM DSP Software for DEC/ALPHA and DEC/MIPS", Aug. 1993, 3 pgs.
"A Brief History of MAX", 1998, 3 pgs.
Miller Puckette, "Combining Event and Signal Processing in the MAX Graphical Programming Environment", 1991, 16 pgs.
Charles Petzold, "Windows 3.1—Hello to TrueType, OLE, and Easier DDE; Farewell to Real Mode",12 pgs.
"MSI Operating System Sensation", downloaded from web May 9, 2003, 5 pgs.
Jon Udell, "Novell's Campaign—The Vision: a billion connected users and device 2000. The Plan: reinvent its operating systems, p services", Feb. 1995, 15 pgs.
"Oberon Prospero, User's Guide, Getting Started", Release 1.1, May 1996, 224 pgs.
Joseph Williams, DBMS, Prospero 1.1, Sep. 1996, 6 pgs.
"Application Extensions" Release 1.5, Dec. 1996, 151 pgs.
"HP VEE, The Most Productive Language for Test & Measurement", 1995, 25 pgs.
"Alta Group Announces CONVERGENCE Simulation Architeure Supporting Full-System, Mixed-Level Verification", Oct. 24, 1995, 3 pgs.
The Alta Outlook, A custom newsletter for DAC 1996, 34 pgs.
SPW Product Datasheets and articles, Berkeley Design Technology, Inc., 1995, 47 pgs.
SPW Product Datasheets, 1994-1996, 181 pgs.
David Varn, "Riding the Wireless Wave" Sep. 1996, 13 pgs.
Signal Processing WorkSystem, MATLAB Interface User's Guide incl. notes, Oct. 1995, 83 pgs.
Shok Indra, "Tool chest continues to grow", EE Times, Dec. 15, 1995, 1 pg.
James Carroll, "Smalltalk-based Visual Programming Tools", 1995, 17 pgs.
"HP ORB Plus and Distributed SmallTalk", Sep. 1993, 3 pgs.
Bernini et al., VIPERS: A Data Flow Visual Programming Environment Based on the Tcl Language, 1994, 3 pgs.
"PARCPLACE-DIGITALK Announces Availability of PARTS(R) for JAA(TM), Ships $1.2 Million in Product During First Week", Jul. 22, 1996, 2 pgs.
Digitalk List of Books, 1986-1994, 1 pg.
"Smalltalk V, 32-Bit Object-Oriented Programming System Tutorial", version 3.0, Sep. 1994, 203 pgs.
"1995 Digitalk PARTners Catalog", 1994, 40 pgs.
"Distributed Smalltalk Programmer's Reference" Visual Works, 1996, 159 pgs.
"Distributed Smalltalk User's Guide", Visual Works, 1996, 191 pgs.
"Part Reference", VisualSmalltalk Enterprise, 1995, 629 pgs.
"Workbench User's Guide", VisualSmalltalk Enterprise, 1995, 227 pgs.
"User's Guide", VisualSmalltalk Enterprise, 1995, 181 pgs.
"Parts Wrapper for CICS, User's Guide", VisualSmalltalk Enterprise 1996, 112 pgs.
"Tools Reference Manual", VisualSmalltalk Enterprise, 1995, 351 pgs.
"PARTS Workbench Reference Manual", Version 3.0, VisualSmalltalk Enterprise, 1994, 439 pgs.
"Tutorial", VisualSmalltalk Enterprise, 1995, 338 pgs.
"Parts Wrapper for CICS/COBOL/EHLLAPI/Relational Databases", 1996, 4 pgs.
Deborah Asbrand, "IMCO Uses Common Sense in Shift to Client/Server", Apr. 1995, 2 pgs.
"Smalltalk Moves into the Fast Lane", Apr. 1995, 1 pg.
"VisualSmalltalk Enterprise", 1995, 4 pgs.
"Parts Wrapper for Relational Databases", May 1995, 1 pg.
Bill Lazar, "Visual Smalltalk Enterprise 3.0", May 1995, 4 pgs.
Brent Whitmore, "Windows-Based Smalltalk Products Go Head to Head", 1995, 6 pgs.
Cate T. Corcoran, "Power Company Juices Up Its Customer Service", Feb. 1995, 2 pgs.
David Linthicum, "Digitalk PARTS", Feb. 1995, 2 pgs.
Rebecca Wirfs-Brock, "How Designs Differ", Dec. 1994, 4 pgs.
Thomas Hoffman, "Capitalizing on Client/Server", Feb. 1995, 2 pgs.
Richard A. Danca, "One Bank's Approach to IT: Standard—But Not Stodgy", Aug. 1994, 4 pgs.
David Linthicum, "Smalltalk: Getting the Message to IS Developers", May 1994, 4 pgs.
Dan Richman, "A Utility Company's New Source of Power", Apr. 1994, 2 pgs.
Brown et al., "Sizing up the Smalltalks", Oct. 1994, 6 pgs.

"The Gospel According to OOP", Mar. 1993, 4 pgs.
"Component-Based Development", Apr. 1993, 4 pgs.
John W. Verity, "Finally, The Buzz is About Smalltalk", Apr. 1993, 2 pgs.
DelRossi et al., PARTS Workbench for Win32 2.0, Elegant and Innovative, Feb. 1994, 4 pgs.
"New Power Source at Utility", Feb. 1995, 1 pg.
Tibbetts et al. ,"Objects for the Enterprise", 1996, 1 pg.
"HP Distributed Smalltalk User's Guide", 5$^{th}$ Edition, Oct. 1995, 284 pgs.
Robert C. Waterbury, "Software Trends Lead to Control Forefront", Jun. 1994, 4 pgs.
"Paragon ActiveX Controls Manual", 1997, 280 pgs.
"Paragon TNT Reference Manual", 1996, 969 pgs.
"Paragon TNT OLE Support Guide", 1996, 209 pgs.
"Paragon TNT User's Guide", 1996, 544 pgs.
Cunningham et al, "An object-oriented implementation of a graphical-programming system", 1994, 11 pgs.
Steinman et al. "Visual Programming with Prograph CPX", 1995, 418 pgs.
Press Release, "HP ORB Plus and Distributed SmallTalk", 3 pgs.
Raymond Cote, "Prograph CPX: Purely Visual", Jan. 1995, 7 pgs.
"The Power of Prograph CPX", need date, 6 pgs.
Philip T. Cox, "Cross-Platform Application Development with Prograph CPX", need date, 6 pgs.
John Shackelford, "Using Shared Libraries in CPX", need date, 13 pgs.
CPX, ABC Reference, Feb. 1996, 526 pgs.
Prograph CPX for Windows website, 14 pgs.
Visual Programming with Prograph CPX Publication Details from website, 6 pgs.
Prograph CPX for the Macintosh, 3 pgs.
Rapid Application Development (RAD) with Entrada! Developer and Entrada! Corporate, 7 pgs.
Press releases, 1996, 49 pgs.
The Pictorius Net Servers Mailing List, 13 pgs.
Brett Kottmann, Software Review, Pictorius iNet Developer 2.0, 1996, 7 pgs.
MacWeek Articles, May 13, 1996, 57 pgs.
PSOS CORBA Presentation, 1997, 10 pgs.
Software, Flowcharter 4.0 by Micrografx, 1995, 3 pgs.
Susan Coote, "Graphical and Iconic Programming Languages for Distributed Process Controls An Object Oriented Approach", IEEE, 1988, 4 pgs.
The History of Visual Basic, Paraphrased from the Visual Basic Programmer's Journal, Feb. 2000, 2 pgs.

* cited by examiner

SYSTEM AND METHOD FOR CREATING A GRAPHICAL PROGRAM WHICH INVOKES METHODS AND PROPERTIES OF OBJECTS

CONTINUATION DATA

This is a divisional of application Ser. No. 08/810,079 titled "System and Method for Developing automation Clients Using a Graphical Data Flow Program" and filed Mar. 4, 1997 now U.S. Pat. No. 6,064,812, whose inventors were Murali Parthasarathy and Omid Sojoodi, which is a continuation-in-part of application Ser. No. 08/717,771 titled "System and Method for Performing Class Checking of Objects in a Graphical Data Flow Program" and filed Sep. 23, 1996, whose inventors were Omid Sojoodi and Stephen W. Rogers.

FIELD OF THE INVENTION

The present invention relates to graphical programming, and more particularly to accessing automation server objects by an automation client in a graphical data flow program.

DESCRIPTION OF THE RELATED ART

Traditionally, high level text-based programming languages have typically been used by programmers in writing applications programs. Many different high level programming languages exist, including BASIC, C, FORTRAN, Pascal, COBOL, ADA, APL, etc. Programs written in these high level languages are translated to the machine language level by translators known as compilers. The high level programming languages in this level, as well as the assembly language level, are referred to in this disclosure as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. For example, text-based programming environments have traditionally used a number of programs to accomplish a given task. Each program in turn often comprises one or more subroutines. Software systems typically coordinate activity between multiple programs, and each program typically coordinates activity between multiple subroutines. However, in a text-based environment, techniques for coordinating multiple programs generally differ from techniques for coordinating multiple subroutines. Furthermore, since programs ordinarily can stand alone while subroutines usually cannot in a text-based environment, techniques for linking programs to a software system generally differ from techniques for linking subroutines to a program. Complexities such as these often make it difficult for a user who is not a specialist in computer programming to efficiently program a computer system in a text-based environment.

The task of programming a computer system to model a process often is further complicated by the fact that a sequence of mathematical formulas, mathematical steps or other procedures customarily used to conceptually model a process often does not closely correspond to the traditional text-based programming techniques used to program a computer system to model such a process. For example, a computer programmer typically develops a conceptual model for a physical system which can be partitioned into functional blocks, each of which corresponds to actual systems or subsystems. Computer systems, however, ordinarily do not actually compute in accordance with such conceptualized functional blocks. Instead, they often utilize calls to various subroutines and the retrieval of data from different memory storage locations to implement a procedure which could be conceptualized by a user in terms of a functional block. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

One particular field in which computer systems are employed to model physical systems is the field of instrumentation. An instrument is a device which collects information from an environment and displays this information to a user. Examples of various types of instruments include oscilloscopes, digital multimeters, pressure sensors, etc. Types of information which might be collected by respective instruments include: voltage, resistance, distance, velocity, pressure, frequency of oscillation, humidity or temperature, among others. An instrumentation system ordinarily controls its constituent instruments from which it acquires data which it analyzes, stores and presents to a user of the system. Computer control of instrumentation has become increasingly desirable in view of the increasing complexity and variety of instruments available for use.

In the past, many instrumentation systems comprised individual instruments physically interconnected. Each instrument typically included a physical front panel with its own peculiar combination of indicators, knobs, or switches. A user generally had to understand and manipulate individual controls for each instrument and record readings from an array of indicators. Acquisition and analysis of data in such instrumentation systems was tedious and error prone. An incremental improvement in the manner in which a user interfaced with various instruments was made with the introduction of centralized control panels. In these improved systems, individual instruments were wired to a control panel, and the individual knobs, indicators or switches of each front panel were either preset or were selected to be presented on a common front panel.

A significant advance occurred with the introduction of computers to provide more flexible means for interfacing instruments with a user. In such computerized instrumentation systems the user interacted with a software program executing on the computer system through the video monitor rather than through a manually operated front panel. These earlier improved instrumentation systems provided significant performance efficiencies over earlier systems for linking and controlling test instruments.

However, these improved instrumentation systems had significant drawbacks. For example, due to the wide variety of possible testing situations and environments, and also the wide array of instruments available, it was often necessary for a user to develop a program to control the new instrumentation system desired. As discussed above, computer programs used to control such improved instrumentation systems had to be written in conventional text-based programming languages such as, for example, assembly language, C, FORTRAN, BASIC, or Pascal. Traditional users of instrumentation systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation data. Thus, development and maintenance of the software elements in these instrumentation systems often proved to be difficult.

U.S. Pat. No. 4,901,221 to Kodosky et al discloses a graphical system and method for modeling a process, i.e. a graphical programming environment which enables a user to easily and intuitively model a process. The graphical programming environment disclosed in Kodosky et al can be considered the highest and most intuitive way in which to interact with a computer. A graphically based programming environment can be represented at level above text-based high level programming languages such as C, Pascal, etc. The method disclosed in Kodosky et al allows a user to construct a diagram using a block diagram editor such that the diagram created graphically displays a procedure or method for accomplishing a certain result, such as manipulating one or more input variables to produce one or more output variables. As the user constructs the data flow diagram using the block diagram editor, machine language instructions are automatically constructed which characterize an execution procedure which corresponds to the displayed procedure. Therefore, a user can create a text-based computer program solely by using a graphically based programming environment. This graphically based programming environment may be used for creating virtual instrumentation systems and modeling processes as well as for any type of general programming.

Therefore, Kodosky et al teaches a graphical programming environment wherein a user manipulates icons in a block diagram using a block diagram editor to create a data flow "program." A graphical program for controlling instruments or implementing instrumentation functions is referred to as a virtual instrument (VI). In creating a virtual instrument, a user first creates a front panel including various controls or indicators that represent the respective input and output that will be used by the VI. When the controls and indicators are created in the front panel, corresponding icons or terminals are automatically created in the block diagram by the block diagram editor. The user then chooses various functions that accomplish his desired result, connecting the corresponding function icons between the terminals of the respective controls and indicators. In other words, the user creates a data flow program, referred to as a block diagram, representing the graphical data flow which accomplishes his desired function. This is done by wiring up the various function icons between the control icons and indicator icons. The manipulation and organization of icons in turn produces machine language that accomplishes the desired method or process as shown in the block diagram.

A user inputs data to a virtual instrument using front panel controls. This input data propagates through the data flow block diagram or graphical program and appears as changes on the output indicators. The data that flows from the controls to the indicators in this manner is referred to as control data. In an instrumentation application, the front panel can be analogized to the front panel of an instrument. The user adjusts the controls on the front panel to affect the input and views the output on the respective indicators.

In parallel to the development of graphical data flow programming for various applications, such as virtual instrumentation, object automation technology has emerged in the area of software development. The notion of object automation relates to "automation servers" "exporting" their "objects" for use by "automation clients." An automation server is a software application which makes available its classes to be accessed from another application, referred to as an automation client. An automation client instantiates objects from the classes in the type libraries. Objects have properties and methods. Properties are the data associated with the object and typically determine attributes of the object, such as the number of columns of a spreadsheet. Methods are functions or operations which the object is capable of performing, such as drawing a spreadsheet on a display screen. An automation server exports an object by making the methods and properties of the object invokeable by an automation client.

An example of an automation server is Microsoft Excel®, which exports its objects for use by automation clients. An example of an automation technology is the OLE Automation interface, also known as Active X interface, Dispatch, developed by Microsoft. For example, the Microsoft Excel spreadsheet program, the Microsoft Access® database program, and the Microsoft Word® word processing program, all export objects using the OLE Automation interface. OLE Automation is an industry standard automation interface used by application programs to provide objects in a consistent manner to other application programs, development tools, and macro languages. Other examples of automation technologies are OpenDoc® and the Common Object Request Broker Architecture (CORBA).

Often it is desirable to display, manipulate, catalog, edit or perform other operations, such as may be performed by an automation server, on data acquired or generated by a graphical program or virtual instrument. For example, it may be desirable for a virtual instrument to display acquired temperature samples in a spreadsheet, such as a Microsoft Excel spreadsheet. More generally, it would be desirable to provide a system and method which enables a graphical data flow programming system to be able to invoke objects in automation servers for a variety of applications.

Therefore, improved methods are desired for enabling a graphical data flow programming system to access automation servers. More particularly, an improved system and method is desired which enables a graphical data flow program to be constructed which uses automation server objects.

SUMMARY OF THE INVENTION

The present invention provides a system and method for creating an automation client, using a graphical programming environment, wherein the automation client is operable to invoke methods and/or properties of an object instantiated from an automation class exported by an automation server. In one embodiment, the method provides a set of automation nodes and controls which a user employs to create a graphical automation client program. The automation client executes in a computer which includes a display screen and a user input device. In one embodiment, the automation client performs instrumentation control functions.

In one embodiment the method includes displaying on the computer screen an automation refnum, i.e., a reference to an automation class, an automation open node, and an automation invoke node and/or an automation property node in response to user input, such as the user dragging the nodes from a palette and placing or dropping the nodes in the graphical program, such as a virtual instrument block diagram. The automation refnum is used to specify the automation class. The automation open node is operable to instantiate an object of the automation class referenced by the automation refnum. The automation invoke node and automation property node are operable to invoke methods and properties, respectively, of the instantiated object.

The method further includes the automation refnum displaying a list of automation application type libraries of automation clients from which a user selects a type library to associate with the automation refnum. The automation refnum further displays a list of automation classes in the selected type library from which a user selects an automation class to associate with the automation refnum. The automation refnum is then connected to the automation open node in order for the refnum to provide information specifying the automation class and type library selected by the user to the open node. The automation open node uses the information to instantiate the object from the selected automation class.

The method further includes connecting the automation open node to the automation invoke node and/or automation property node in order for the open node to provide to the invoke node and/or property node information specifying the selected automation class and type library at edit-time and to provide a reference to the object instantiated by the open node at run-time.

Where an automation invoke node is used in the graphical program, the method further includes displaying a list of methods of the selected automation class from which a user selects one of the methods in the list. The automation invoke node is operable to invoke the selected method on the instantiated object at run-time.

Where an automation property node is used in the graphical program, the method further includes displaying a list of properties of the selected automation class from which a user selects one or more properties from the list. The automation property node is operable to invoke the selected property on the instantiated object at run-time.

The method further includes constructing executable instructions in response to the graphical program including the automation nodes. The executable instructions are operable to invoke methods and/or properties of the instantiated object. The method then executes the executable instructions on the computer.

In one embodiment, the automation technology is the OLE Automation interface. In one embodiment, the method includes displaying a list of automation technologies, such as OLE Automation, CORBA, and OpenDoc, from which a user selects an automation technology to associate with the automation refnum.

Thus the present invention provides a system and method for creating a graphical automation client program, using a graphical programming environment, for invoking methods and/or properties of an object instantiated from an automation class exported by an automation server.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

U.S. patent application Ser. No. 08/716,725 titled "System and Method for Performing Interface Independent Virtual Instrumentation Functions in a Graphical Data Flow Program" filed Sep. 23, 1996, whose inventors were Omid Sojoodi and Scott A. Rust, and which is assigned to National Instruments Corporation, is hereby incorporated by reference in its entirety as though fully and completely set forth herein.

U.S. patent application Ser. No. 08/717,771 titled "System and Method for Performing Class Checking of Objects in a Graphical Data Flow Program" filed Sep. 23, 1996, whose inventors were Omid Sojoodi and Steven W. Rogers, and which is assigned to National Instruments Corporation, is hereby incorporated by reference in its entirety as though fully and completely set forth herein.

U.S. patent application Ser. No. 08/717,772 titled "System and Method for Performing Instrumentation Independent Virtual Instrumentation Functions Using Attribute Nodes in a Graphical Data Flow Program" filed Sep. 23, 1996, whose inventors were Omid Sojoodi and Steven W. Rogers, and which is assigned to National Instruments Corporation, is hereby incorporated by reference in its entirety as though fully and completely set forth herein.

U.S. Pat. No. 5,481,741 titled "Method and Apparatus for Providing Attribute Nodes in a Graphical Dataflow Environment" is hereby incorporated by reference in its entirety as though fully and completely set forth herein.

Instrumentation Control System

Figure 1:
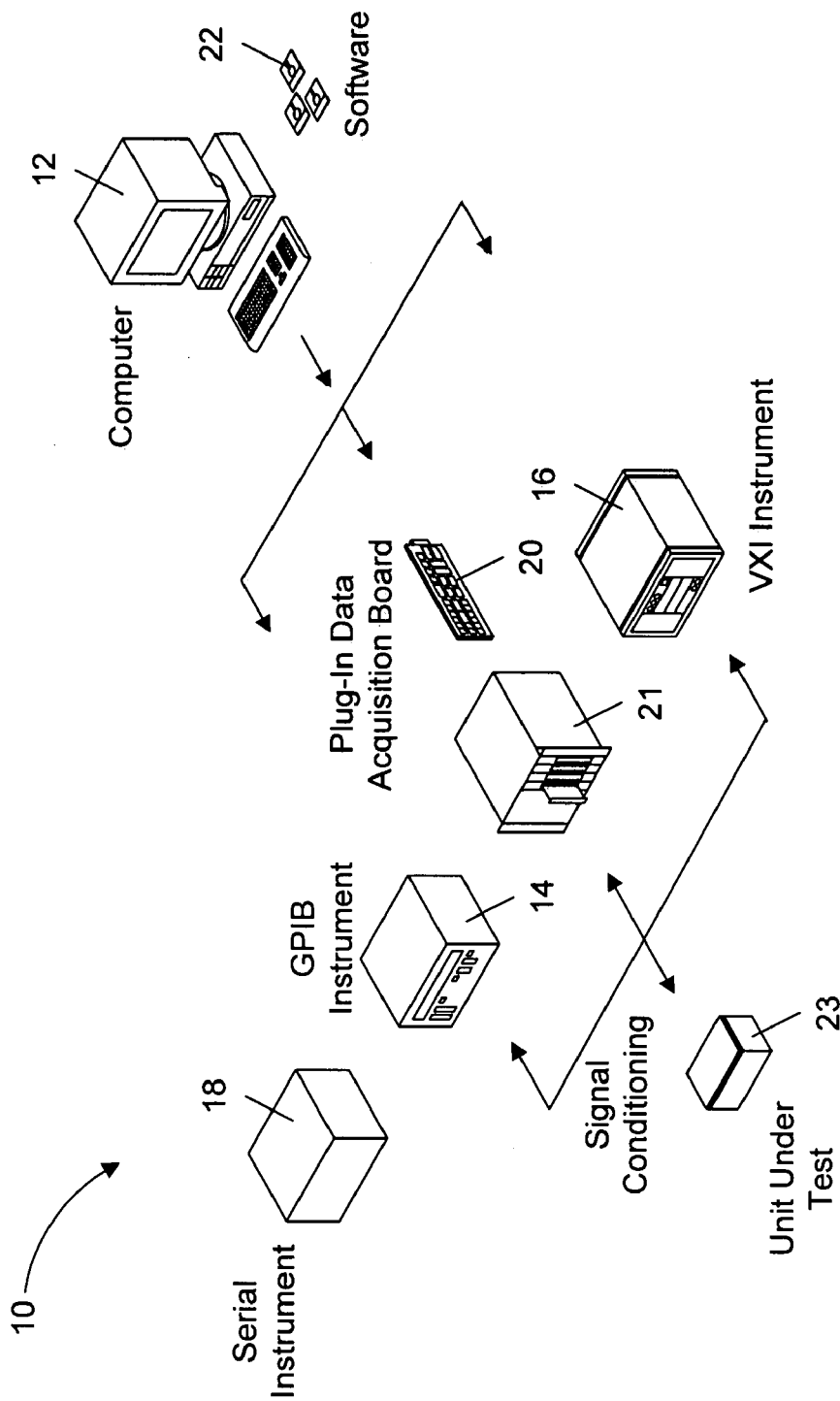
FIG. 1 illustrates an instrumentation control system according to the present invention.

Referring now to FIG. 1, an instrumentation system 10 is shown. The present invention may be used in any of various types of graphical programming systems and graphical data flow programming systems. For example, the present invention may be used in a general purpose graphical programming system or general purpose graphical data flow programming system. In the preferred embodiment, the invention is used in a graphical programming system for virtual instrumentation, and this embodiment is described below.

The system 10 comprises a computer 12, which connects to one or more instruments. The one or more instruments may include a GPIB (general purpose interface bus) instrument 14, a VXI (VME eXtension for Instrumentation) chassis 16 comprising one or more VXI card instruments, a serial instrument 18 and/or a data acquisition board 20. The GPIB instrument 14 is coupled to the computer 12 via a GPIB interface provided by the computer 12. The VXI instrument 16 is coupled to the computer 12 via a VXI bus or MXI bus provided by the computer. The serial instrument 18 is coupled to the computer 12 through a serial port, such as an RS-232 port, provided by the computer 12. Finally, the data acquisition board 20 is coupled to the computer 12, typically by being plugged in to an I/O slot in the computer such as a PCI bus slot, an ISA bus slot, an EISA bus slot, or a MicroChannel bus slot provided by the computer 12. In typical instrumentation control systems an instrument will not be present of each interface type and in fact many systems may only have one or more instruments of a single interface type, such as only GPIB instruments. The term "instrument" used herein also includes software code or software objects which implement instrument functionality or are used to control instruments.

The instruments are coupled to a unit under test (UUT) 23, a process, or are coupled to receive field signals, typically generated by transducers. The system 10 may be used in a data acquisition and control application, or may instead be used in a test and measurement application. If the system 10 is used in a data acquisition application, the system 10 also preferably includes signal conditioning circuitry 21 coupled between the data acquisition board 20 and transducers.

The system 10 preferably includes a memory media, such as magnetic media, or floppy disks 22, on which computer programs according to the present invention are stored. In one embodiment of the system 10, software programs according to the present invention are also stored on a memory or hard drive of the computer and executed by a CPU of the computer. The CPU executing code and data from the memory thus comprises a means for performing various instrumentation control functions according to the steps described below. In the present disclosure, the term "computer-readable storage media" is intended to include any of various types of memory media or machine readable media for storing data, including floppy disks, CDs or CD-ROMs, and other distributable media, as well as computer memories such as hard drives, optical storage, DRAM (dynamic RAM) or other types of computer memory.

Computer Block Diagram

Figure 2:
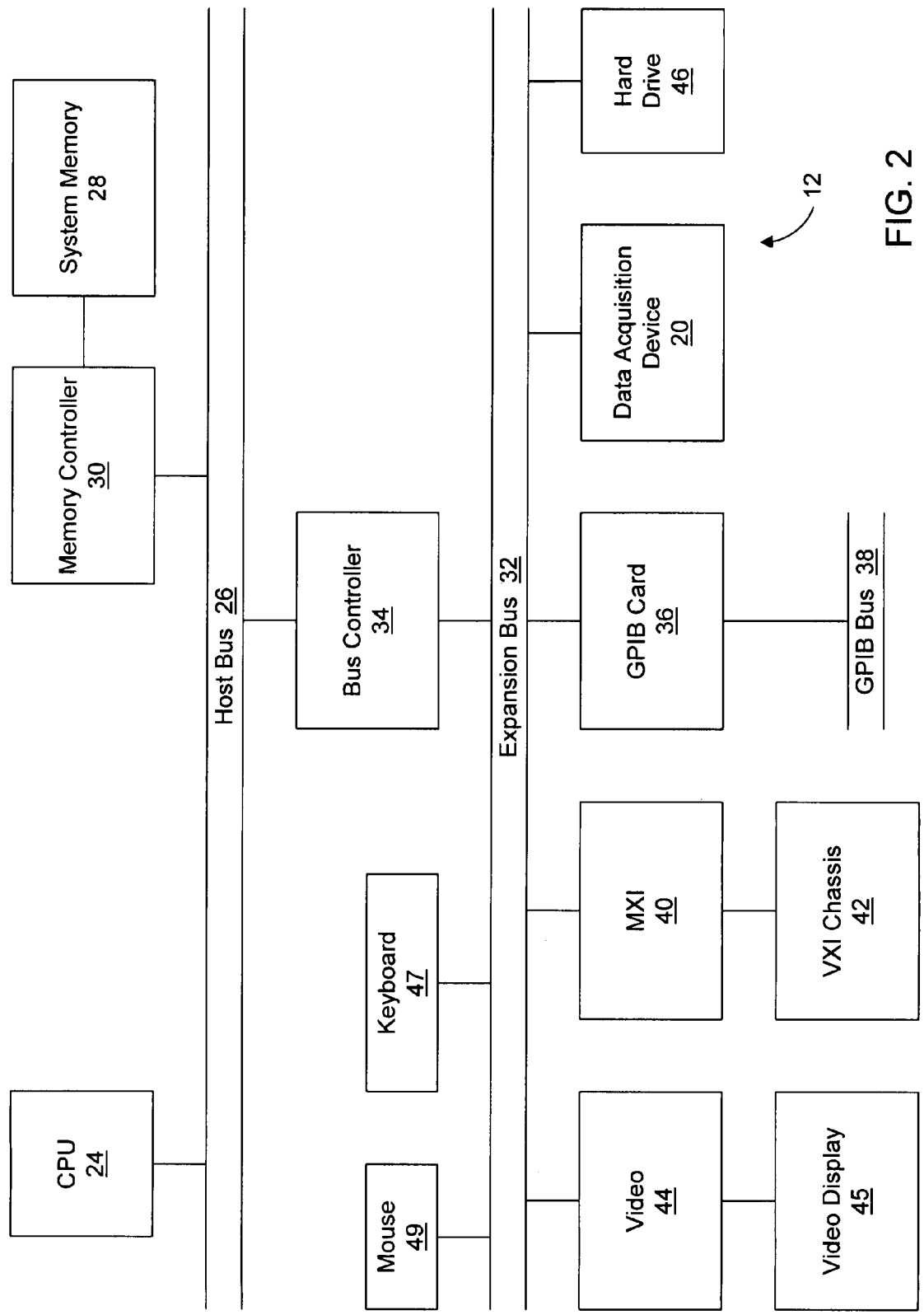
FIG. 2 is a block diagram of the computer of the control system of FIG. 1.

Referring now to FIG. 2, a block diagram of the computer 12 (of FIG. 1) is shown. The elements of a computer not necessary to understand the operation of the system 10 have been omitted for simplicity. The computer 12 includes at least one central processing unit or CPU 24 which is coupled to a processor or host bus 26. The CPU 24 may be any of various types, including an x86 processor, a PowerPC processor, a CPU from the Motorola family of processors, a CPU from the SPARC family of RISC processors, as well as others. Main memory 28 is coupled to the host bus 26 by means of memory controller 30. The main memory 28 stores the various portions of instrumentation control software, including, inter alia, instrumentation control application software, automation servers, automation clients, code and data for automation nodes and controls, an object manager for managing objects, and object type libraries including class information about the classes exported by the automaton servers. The main memory 28 also stores operating system software as well as the software for operation of the computer system, as well known to those skilled in the art. The instrumentation control software will be discussed in more detail below.

The host bus 26 is coupled to an expansion or input/output bus 32 by means of a bus controller 34. The expansion bus 32 includes slots for various devices such as the data acquisition board 20 (of FIG. 1), a GPIB interface card 36 which provides a GPIB bus interface 38 to the GPIB instrument 14 (of FIG. 1), and an MXI bus card 40 coupled to a VXI chassis 16 for receiving VXI card instruments (of FIG. 1). The computer 12 further comprises a video controller 44 and hard drive 46 coupled to the expansion bus 32. A video display 45 is coupled to the video controller 44 for displaying video information. The computer 12 further comprises a mouse 49 and keyboard 47 for receiving user input.

Graphical Programming Environment

Figure 3:
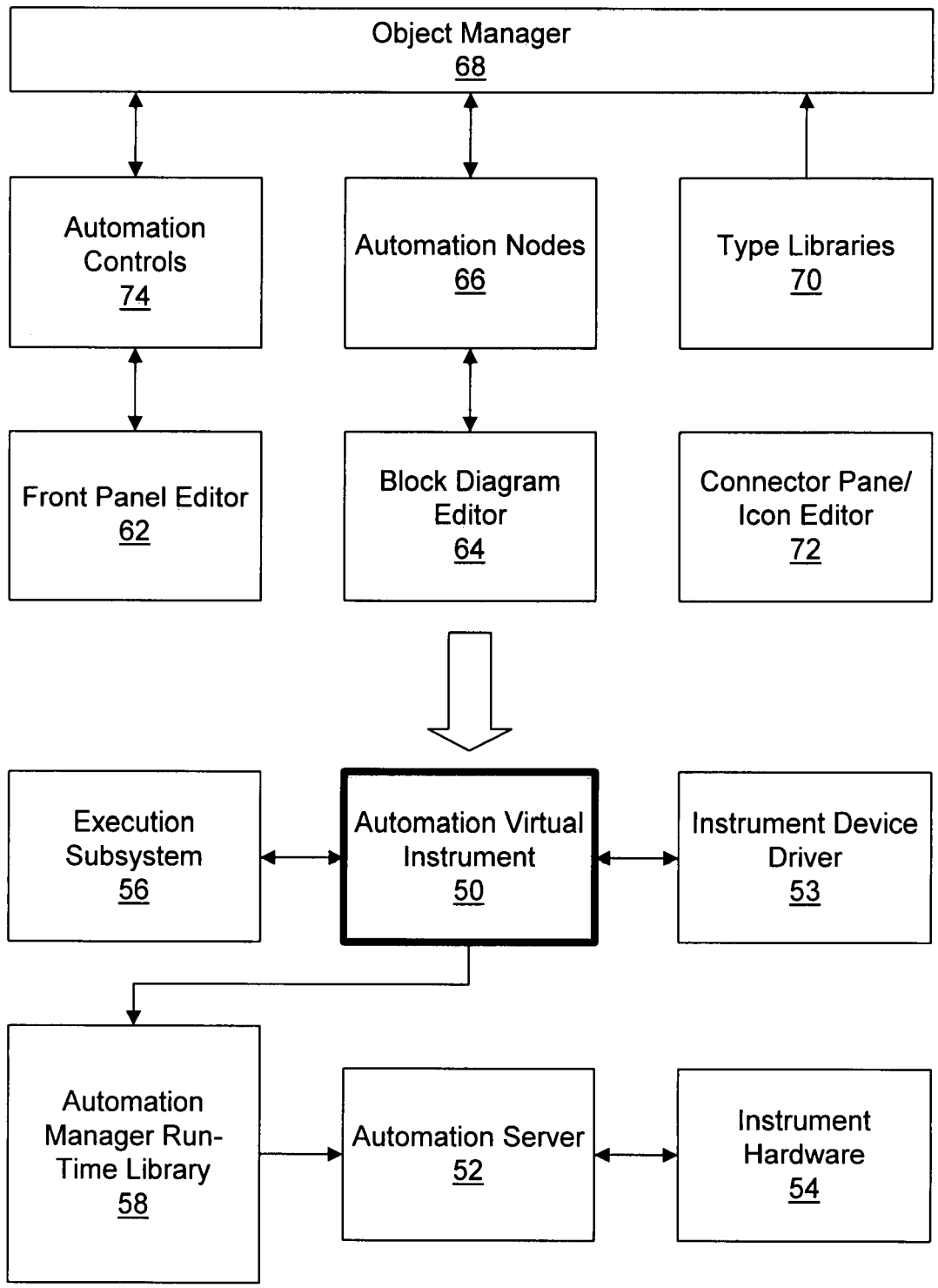
FIG. 3 is a block diagram illustrating the relationship of portions of the instrumentation control system of FIG. 1 according to a first embodiment.

Referring now to FIG. 3, a block diagram illustrating the relationship of portions of the instrumentation control system 10 (of FIG. 1) are shown. Preferably, the elements shown in FIG. 3 (with the exception of the hardware instrument 54) are software elements which are executed on the computer 12 (of FIG. 1). The present invention is used to create an automation graphical program. The present invention is also useable to create an automation graphical program portion which is a part of a larger graphical program.

In the preferred embodiment, a programmer employs a front panel editor 62, a block diagram editor 64, and a connector pane/icon editor 72 of a graphical programming environment to produce an automation graphical program. In the instrumentation application of the preferred embodiment, the graphical program is referred to as an automation virtual instrument (VI) 50. The block diagram editor 64 generates executable instructions, i.e., machine language instructions, in response to the VI 50. The VI 50 developed by the programmer is executed by an execution subsystem 56 of the graphical programming environment to control an instrument 54. The instrument 54 is illustrative of instruments such as those of FIG. 1.

Figure 4:
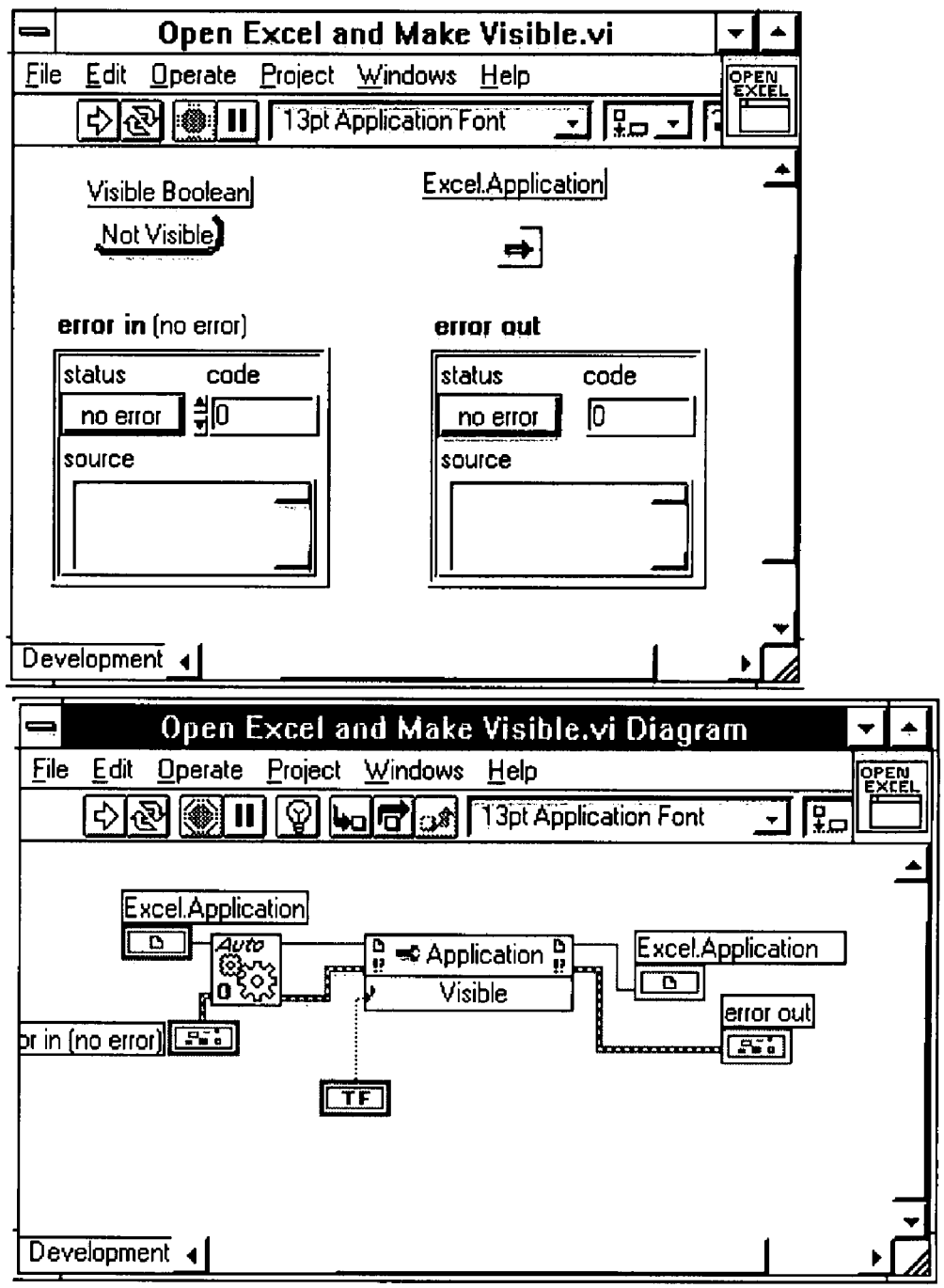
FIG. 4 is a screen shot illustrating the VI block diagram and front panel of an exemplary automation virtual instrument of FIG. 3.

Referring now to FIG. 4, a screen shot from a graphical programming environment including an automation virtual instrument or graphical program exemplary of the VI 50 of FIG. 3 is shown. The screen shot of FIG. 4 comprises an instrument front panel in a window in the upper portion of the screen and a block diagram in a window in the lower portion of the screen. The block diagram comprises program execution elements, referred to as nodes, which are wired or linked together to produce a data flow program. The front panel comprises controls for providing input data to the block diagram and indicators for receiving and/or displaying output data from the nodes of the block diagram.

Preferably the graphical programming system comprises portions of National Instruments LabVIEW software. The drawings of the present disclosure include numerous screen shots displayed during the execution of LabVIEW. In the screen shots, LabVIEW is executing under the supervision of the MICROSOFT WINDOWS 95 operating system. For more information on the LabVIEW graphical programming environment of the preferred embodiment, please see U.S. Pat. No. 5,481,741 referenced above.

Referring again to FIG. 3, the graphical programming environment further comprises an automation control 74. The front panel editor 62 is operable to generate to a VI front panel. The front panel editor 62 communicates with the automation control 74. The automation control 74 communicates with an object manager 68 to obtain or provide information regarding automation type libraries 70 in the system and automation classes in the automation type libraries 70.

Figure 5:
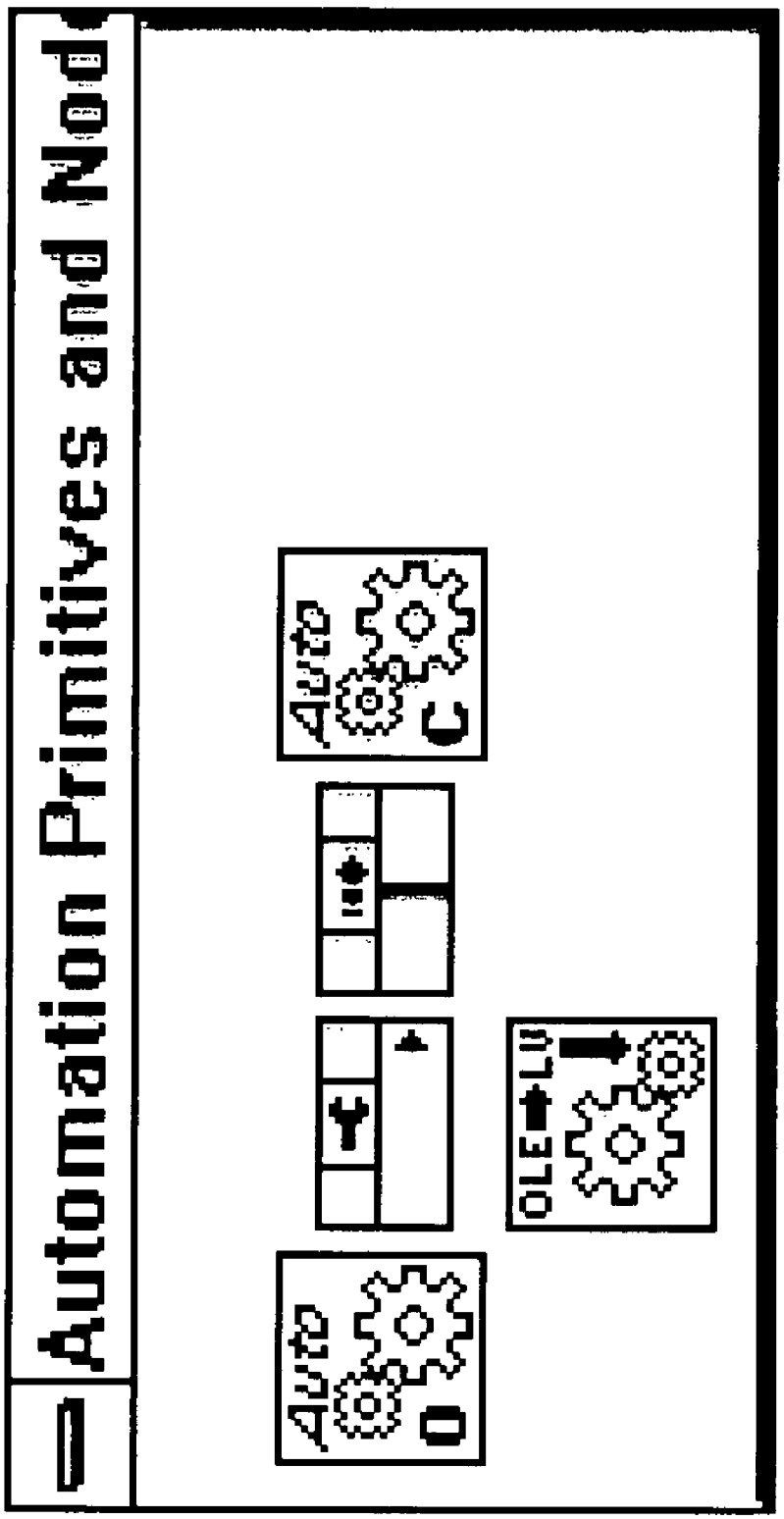
FIG. 5 is a screen shot illustrating the automation nodes palette.

The graphical programming environment further comprises automation nodes 66. The automation nodes 66 are shown in the automation nodes palette of FIG. 5. The automation nodes 66 comprise an automation refnum, an automation open node, an automation close node, an automation invoke node and an automation property node. The block diagram editor 64 is operable to create a VI block diagram, or block diagram. The block diagram editor 64 communicates with the automation nodes 66, which in turn communicate with the object manager 68.

The object manager 68 accesses automation type libraries 70 to acquire information necessary to perform object management operations. Preferably, the object manager 68 communicates with the Windows operating system Registry to obtain information regarding the automation type libraries 70 in the system. The automation control 74, automation nodes 66, and object manager 68 will be discussed in more detail below.

Advantageously, the graphical programming environment, and in particular the automation control 74, the automation nodes 66, the object manager 68, and the automation manager run-time library 58, enable a graphical program to instantiate objects of an unlimited number of automation classes of automation applications, and to remotely invoke properties and methods of the instantiated automation objects.

The graphical programming environment further preferably comprises a connector pane/icon editor 72 for forming VI's into subVI's, i.e., a VI which may be used as a graphical programming element in another VI. The reader is referred to U.S. Pat. No. 5,301,336 for more information about the subVI's and the icon editor 72.

The execution subsystem 56 executes the executable instructions constructed from a block diagram of the VI 50. For more information about the execution subsystem 56 the reader is referred to U.S. Pat. No. 5,481,741.

Preferably, the VI 50 invokes methods and properties of objects of an automation server 52, or more than one automation server, indirectly through the services of an automation manager run-time library 58. Examples of the automation server 52 include Microsoft Excel, Access, Word, and National Instruments ComponentWorks controls. Other examples of the automation server 52 include Claris Works and Cyberdog. The VI 50 controls the instrument 54 through an instrument device driver 53 which includes executable functions which are called by the VI 50 to perform operations in order to control the instrument 54.

The automation nodes 66 and automation control 74 comprise classes and objects, according to the notion of classes and objects in the art of object-oriented programming. Each of the automation nodes 66 and the automation control 74 comprise properties and methods. The methods include a method for drawing an icon representation of the object on the video display 45 of the computer 12 either in the VI block diagram or front panel, a method for generating code associated with the different functions of each node or control, and a method for performing type propagation checking. The operation of automation nodes 66 and automation control 74 will be explained in more detail below. As mentioned above, the automation nodes 66 comprise an automation refnum associated with the automation control 74, an automation open node, an automation property node, an automation invoke node, and an automation close node.

Figure 3A:
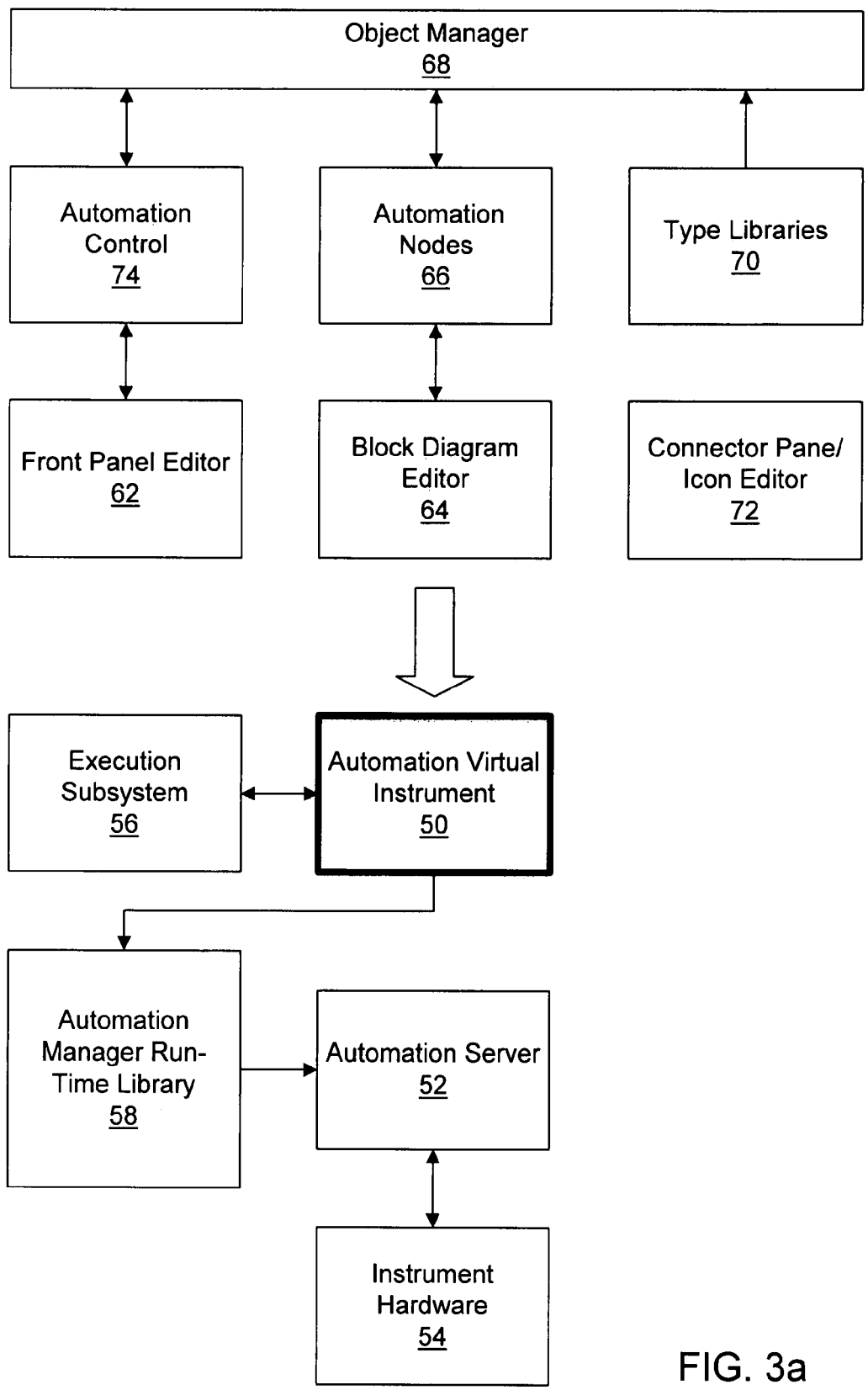
FIG. 3a is a block diagram illustrating the relationship of portions of the instrumentation control system of FIG. 1 according to a second embodiment.

FIG. 3a illustrates an alternate embodiment of the system 10 of FIG. 3. The system 10 is similar to that shown in FIG. 1 and corresponding elements are numbered identically. In the embodiment of FIG. 3a the automation server 52 is a program capable of controlling an instrument 54. For example, the automation server 52 may be a program written in the C language for controlling a GPIB instrument. The VI 50 instantiates objects from the classes exported by the automation server 52 and invokes methods and properties of the objects.

As mentioned above, the graphical program 50 is not necessarily related to controlling an instrument, but rather the graphical program 50 may be for any of various applications. That is, the automation client may have an application other than instrumentation control. In one embodiment similar to that of FIG. 3a, the VI 50 is an automation client application which performs other functions. For example, a programmer desires to develop a stock portfolio viewer in a graphical programming environment and develops an automation client to access Microsoft Excel spreadsheet objects in order to display a stock portfolio.

Advantageously, the graphical system and method for producing the graphical program or VI 50 has a number of benefits. These benefits include reduction in the development time required to create the VI 50 as well as reduction of the number of code defects in the VI 50. Yet another benefit is the simplicity of programming which makes the development of a graphical program, such as an instrumentation control program, more practical for a larger number of people, i.e., those who might not have the skills, or resources to develop the skills, to develop programs according to more conventional text-based methods. The system and method also provides class propagation, class checking and type checking in a graphical programming environment, discussed further below, thus simplifying program development.

Automation Client Creation

Figure 6:
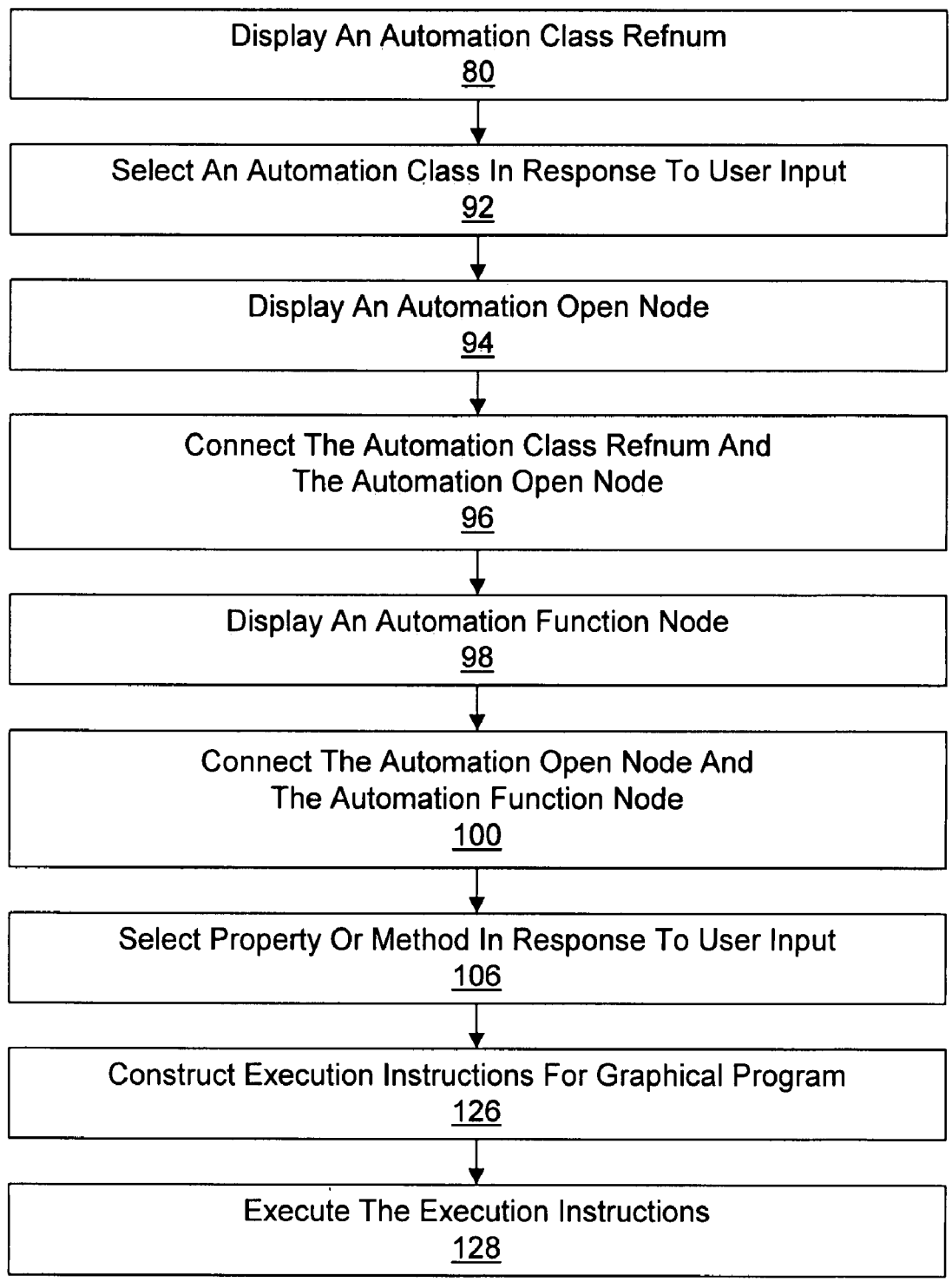
FIG. 6 is a flowchart illustrating steps taken to create and use a graphical automation client program of FIG. 3.
Figure 6A:
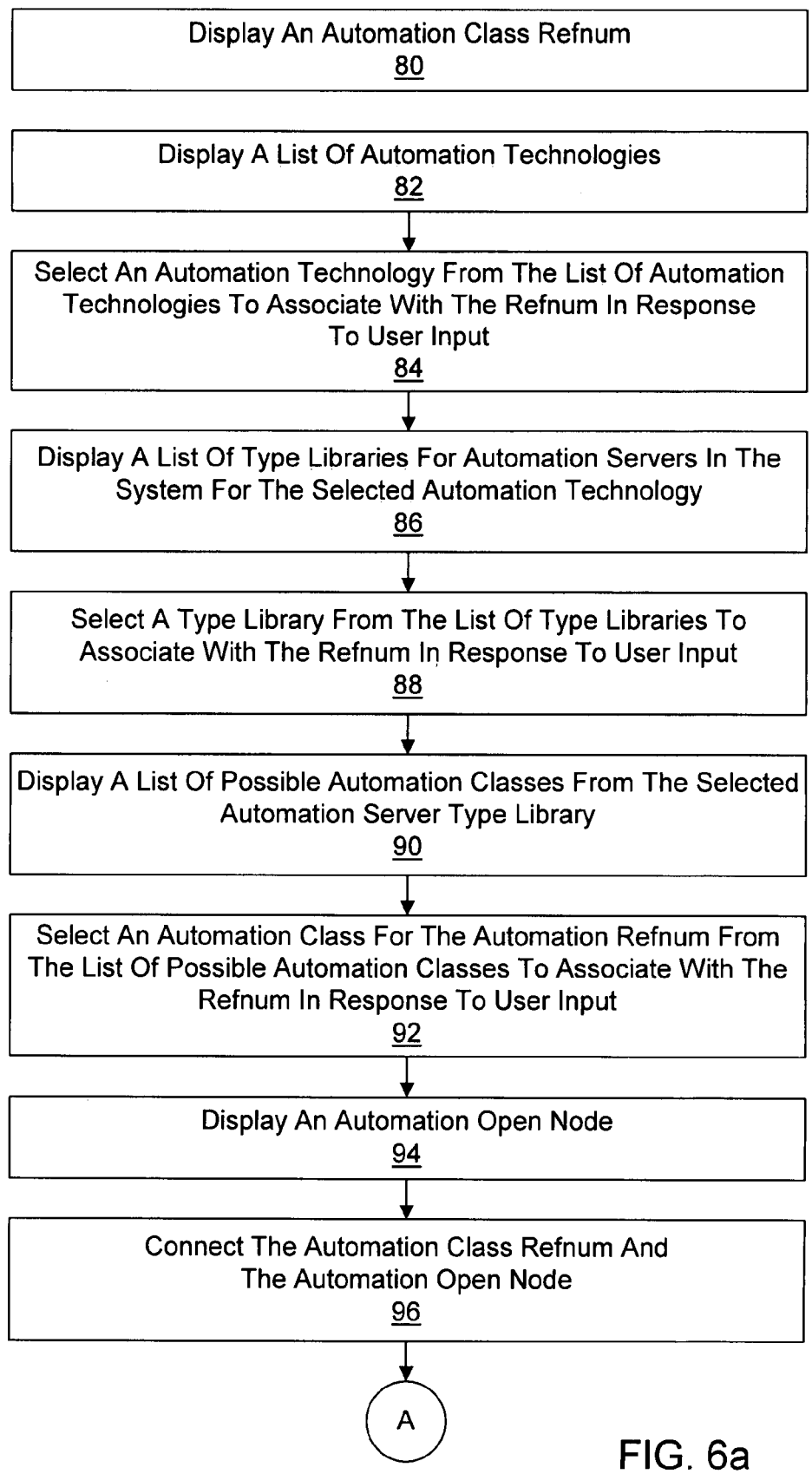
FIGS. 6a, 6b, and 6c are a flowchart illustrating steps taken to create and use a graphical automation client program in more detail than the flowchart of FIG. 6.
Figure 6B:
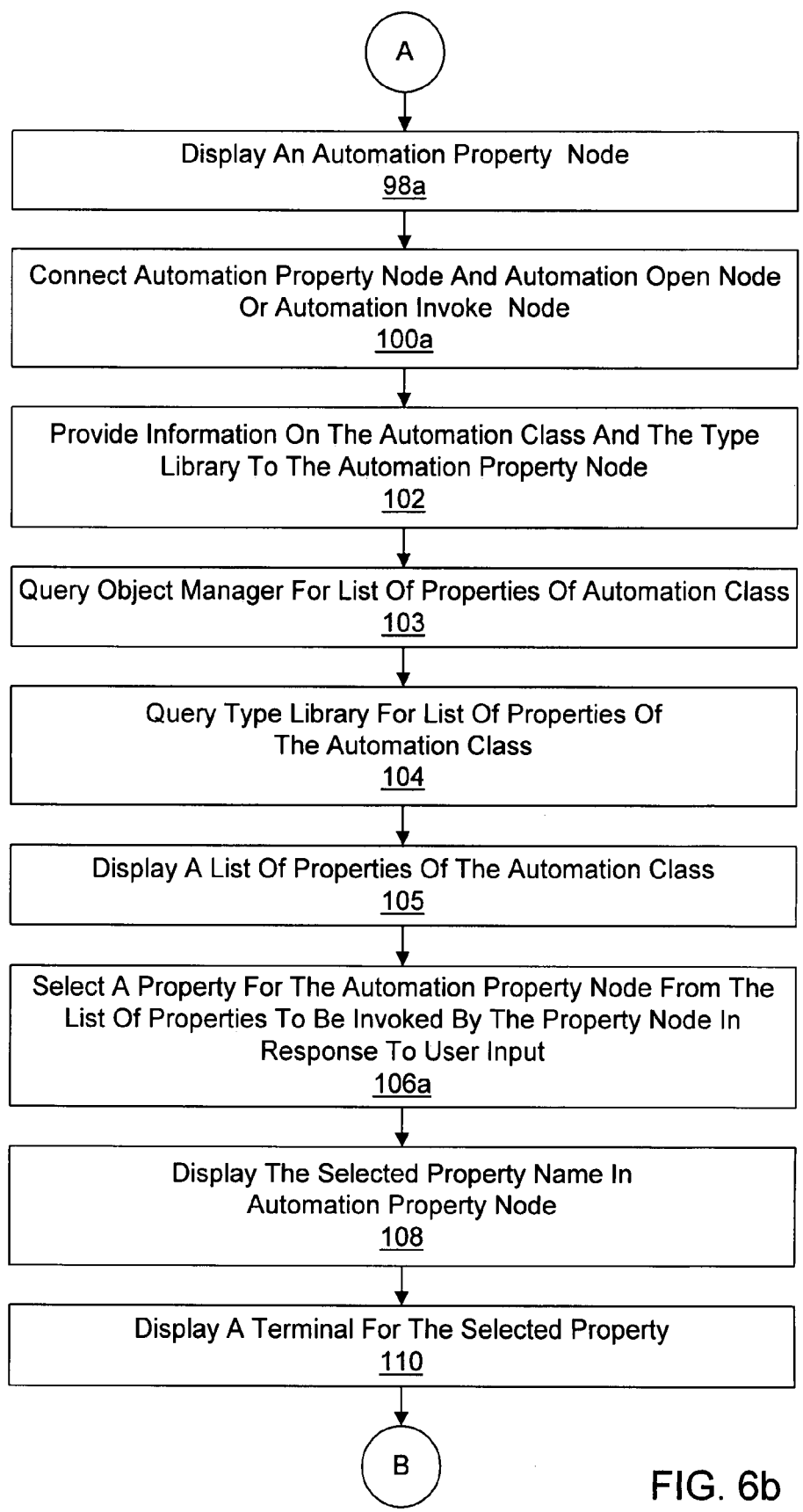
Figure 6C:
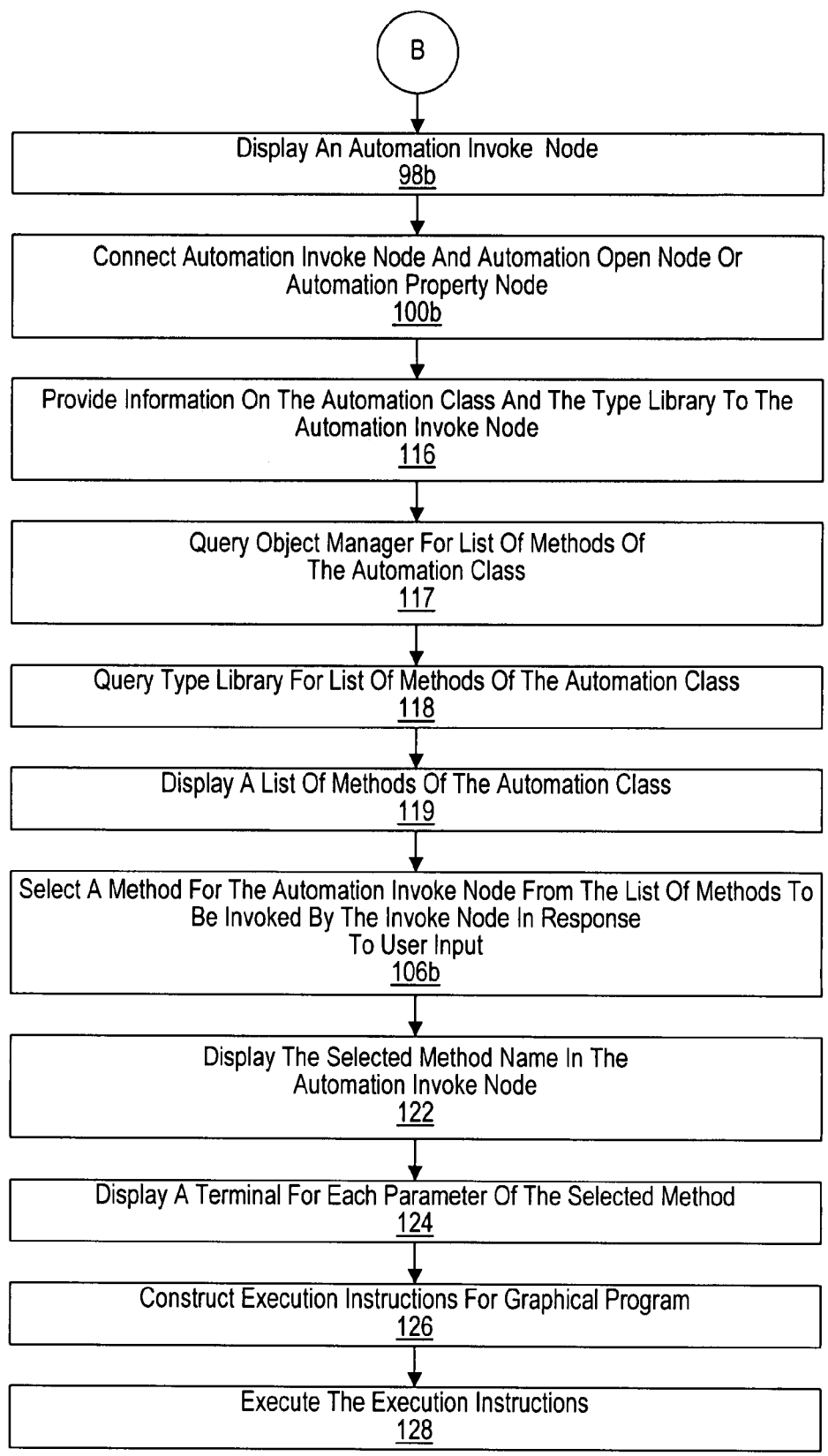

Referring now to FIG. 6, a flowchart illustrating steps taken to create a graphical automation client according to the preferred embodiment of the method is shown. The flowchart of FIG. 6 provides a high level view of the method of the preferred embodiment. The flowchart of FIGS. 6a-6c provide a more detailed view of the method of the present invention. Thus the flowchart of FIG. 6 provides a high level view of the steps of the flowchart of FIGS. 6a, 6b, and 6c, and corresponding steps are numbered identically. The user drops or places an automation control icon on a virtual instrument front panel, and in response the block diagram editor 64 displays a corresponding automation class refnum icon in the block diagram, in step 80. The user then selects an automation class to associate with the automation refnum. The automation refnum receives the user input and associates the user-selected automation class with the automation refnum, in step 92.

The user drops an automation open node on the block diagram and in response the block diagram editor 64 displays an automation open node icon, in step 94. The user connects the automation refnum and the automation open node and in response the block diagram editor 64 displays a wire connecting the automation refnum and the automation open node, in step 96.

The user drops an automation function node in the block diagram and in response the block diagram editor 64 displays an automation function node, in step 98. An automation function node preferably comprises an automation property node or an automation invoke node. In one embodiment, an automation function node may perform functions of automation objects other than invoking methods and properties, such as event handling, i.e., the automation function node may be an automation event node. The user connects the automation open node and the automation function node and in response the block diagram editor 64 displays a wire connecting the automation open node and the automation function node, in step 100. The user may drop both an automation invoke node and an automation property node in creating the graphical automation client. Furthermore, the user may drop one or more of both automation property nodes and automation invoke nodes in order to invoke multiple properties and/or methods in creating the graphical automation client.

The user then selects a property or method and in response the automation property node or automation invoke node receives the user input and associates the user-selected property or method, respectively, with the automation property node or automation invoke node, respectively, in step 106. In the case of the automation property node, the user may select multiple properties to associate with the automation property node.

The graphical programming environment then constructs execution instructions based on the graphical program comprising the automation refnum, automation open node, automation property node and/or automation invoke node, and wires, in step 126. The graphical programming environment then executes the execution instructions, in step 128. A more detailed description of the steps of FIG. 6 is given below with regard to FIGS. 6a, 6b, and 6c.

Figure 7:
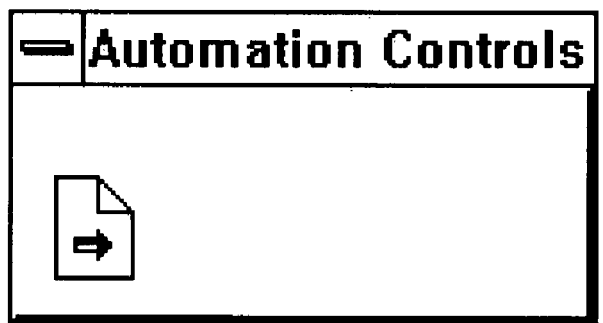
FIG. 7 is a screen shot illustrating the automation control refnum palette.

Referring now to FIGS. 6a, 6b, and 6c, a flowchart illustrating steps taken to create a graphical automation client according to the preferred embodiment of the method in more detail than FIG. 6 is shown. A user drags, preferably using a mouse, an automation control from a refnum palette, shown in FIG. 7, and drops the automation control on a VI front panel.

In response to the user dropping the automation refnum, the front panel editor 62 displays an automation control in the front panel, and the block diagram editor 64 displays an automation refnum associated with the automation control in a block diagram in step 80. Alternatively, the user drops an automation refnum from the palette of FIG. 5 and the front panel editor 62 invokes a method of the automation control 74 to draw an automation control icon in the front panel.

Figure 8:
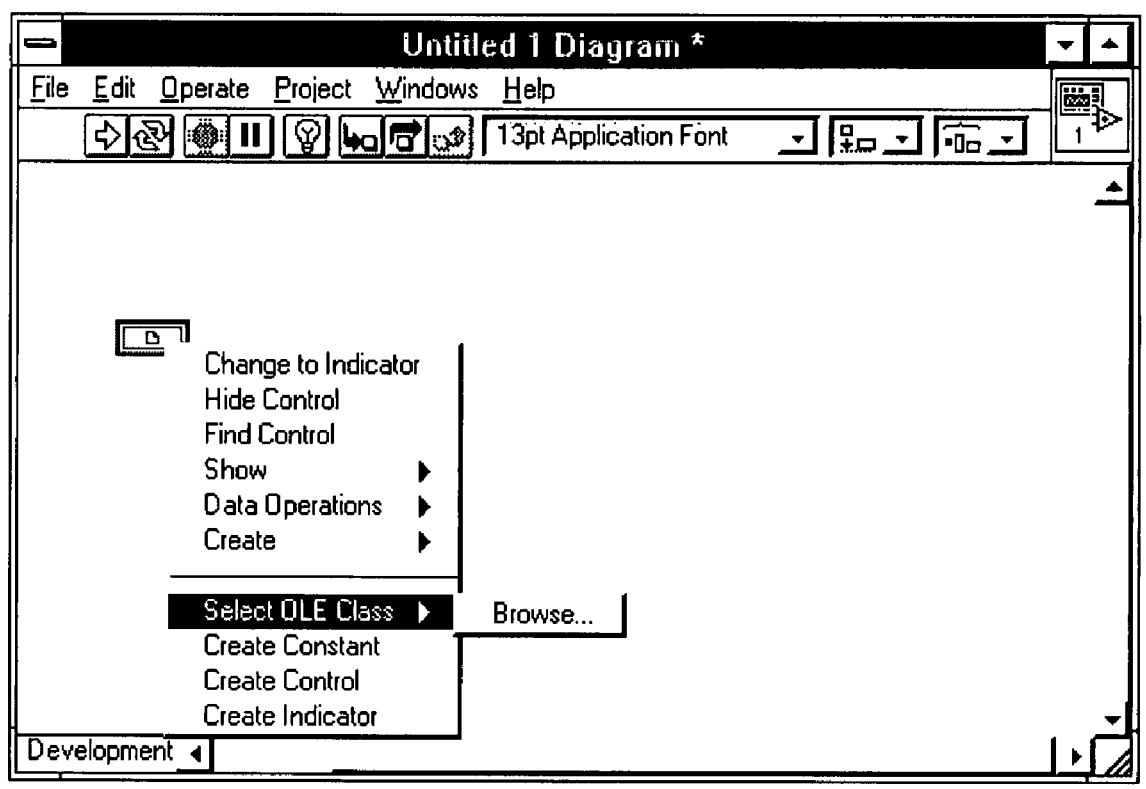
FIG. 8 is a screen shot illustrating an automation refnum in a VI block diagram and a pop-up menu of the automation refnum with a menu selection item for selecting an automation class.

Preferably, the automation control 74 comprises a draw method which the front panel editor 62 and block diagram editor 64 invoke in order to display an automation control icon in the front panel and to display an automation refnum icon in the block diagram, respectively. FIG. 8 shows an automation refnum displayed in a block diagram. FIG. 8 also shows a pop-up menu for the automation refnum including a "Select OLE Class" menu item with a "Browse" item. Preferably, the user right clicks a mouse on the automation refnum in order to see the pop-up menu.

In one embodiment, an automation client program, i.e., a VI, developed using the graphical programming environment is capable of invoking methods of and modifies attributes of objects via a plurality of automation technologies, including Microsoft Automation. Examples of other automation technologies are OpenDoc and the Common Object Request Broker Architecture (CORBA). In this embodiment, the object manager 68 obtains a list of automation technologies in the system. The automation refnum queries the object manager 68 for the list and displays the list of automation technologies for the user in step 82. The user selects one of the automation technologies from the displayed list of automation technologies. In response to the user selection, the automation refnum selects the automation technology from the list of automation technologies and associates the selected automation technology with the automation refnum in step 84.

The automation refnum is a reference to a user-selected automation class. The automation refnum includes a refnum output terminal, to which a wire may be connected. At edit-time, the automation refnum provides, at its output terminal, a type descriptor which specifies an automation class and the type library to which the automation class belongs. The type library is one of the type libraries 70 of FIG. 3. Type descriptors will be described in detail below. The time during which a user is creating, i.e., editing a VI 50, by dropping nodes and wiring them together, is referred to as "edit-time." The time when instructions of the VI 50 are executed is referred to as "run-time".

Referring again to FIG. 6, in response to user input, the automation refnum queries the object manager 68 for a list of type libraries 70 (of FIG. 3) associated with the automation servers present in the system. The automation refnum displays the list of type libraries 70 associated with the automation servers in step 86. Preferably, the object manager 68 provides the automation refnum with a list of OLE Automation type libraries in the system. In one embodiment, the object manager 68 provides the automation refnum with a list of type libraries for each automation technology in the system.

Figure 9:
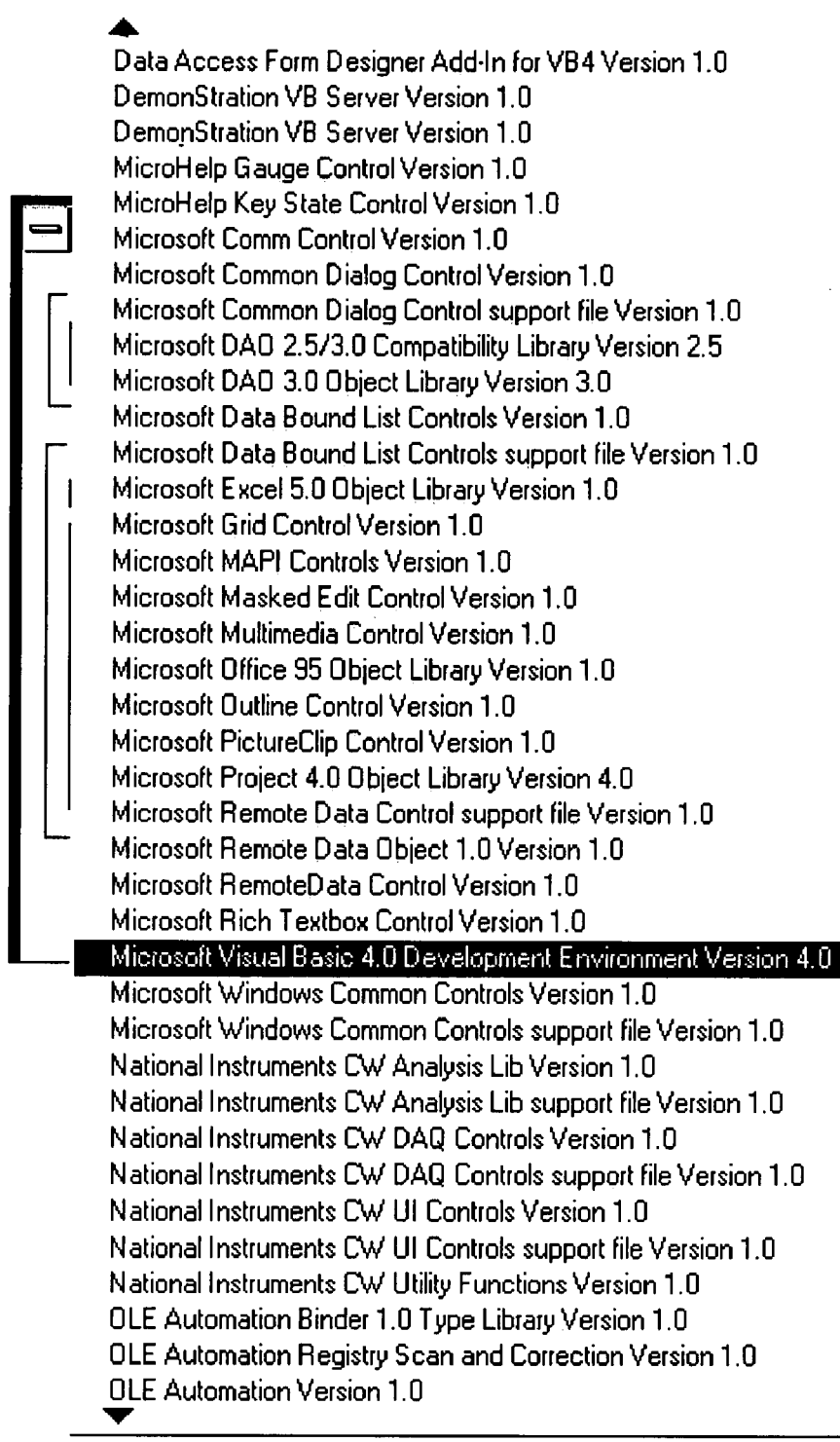
FIG. 9 is a screen shot illustrating an exemplary list of the type libraries associated with the OLE Automation servers present in a system.
Figure 10:
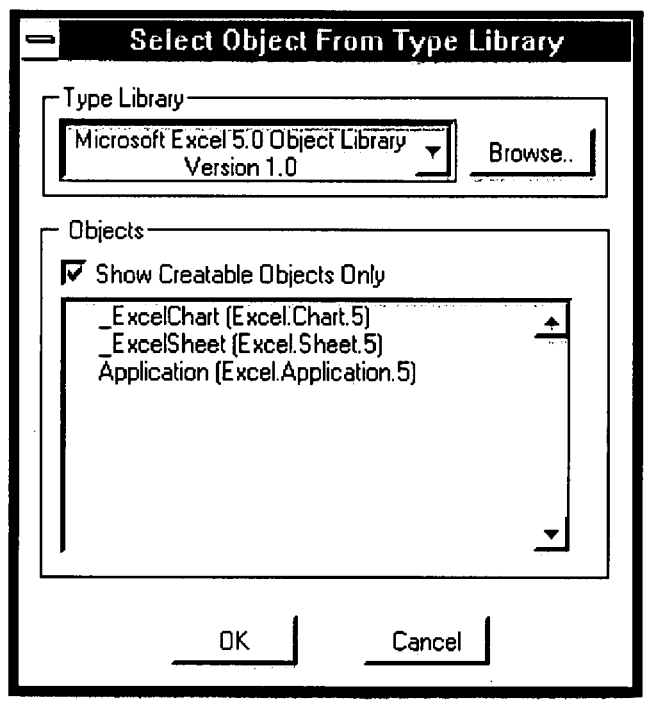
FIG. 10 is a screen shot illustrating a type library browse menu selected from the pop-up menu of FIG. 8.

Preferably, the user input includes the user clicking on the "Browse" item of the "Select OLE class" item of the automation refnum pop-up menu, shown in FIG. 8, and selecting the pull-down menu in the "Type Library" window shown in FIG. 10. Preferably, the object manager 68 queries the Windows Registry to obtain a list of OLE Automation type libraries present in the system. Preferably, the automation refnum displays the type libraries associated with the OLE Automation servers present in the system, as shown in FIG. 9. In one embodiment, the automation refnum displays the type libraries associated with the automation technology which was selected in step 84.

The user selects one of the type libraries from the displayed list of type libraries. In response, the automation refnum selects the type library from the list of type libraries and associates the selected type library with the automation refnum in step 88. At edit-time the automation refnum provides a type descriptor, including information identifying the selected type library, to other automation nodes of the VI 50. FIG. 10 shows the user having selected the "Microsoft Excel 5.0 Object Library Version 1.0" type library from the list of FIG. 9.

In response to the user having selected a type library, the automation refnum queries the object manager 68 for a list of possible automation classes associated with the selected type library in step 90. The object manager 68 queries the selected type library for a list of possible automation classes in the type library. The object manager 68 receives the list of automation classes from the type library and provides the list to the automation refnum. The automation refnum receives the list from the object manager 68 and displays the list, as shown in FIG. 10. FIG. 10 shows the list of possible Microsoft Excel 5.0 automation classes from which automation objects may be instantiated. Preferably, the user may choose for the automation refnum to selectively display only those objects which are creatable, as shown in FIG. 10.

Figure 11:
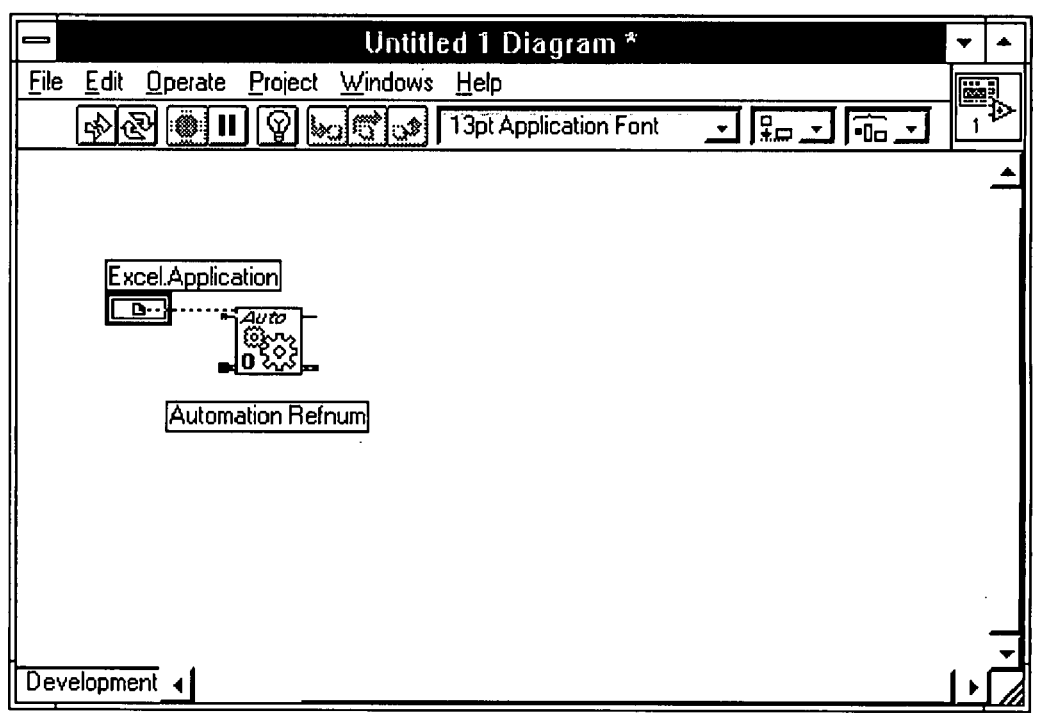
FIG. 11 is a screen illustrating an automation class having been chosen for the automation refnum of FIG. 8 and an automation open node being wired to the automation refnum.

The user selects an automation class from the displayed list of automation classes. In response, the automation refnum selects the automation class from the list of automation classes and associates the selected automation class with the automation refnum in step 92. At edit-time the automation refnum provides a type descriptor, including information identifying the selected automation class, to other automation nodes of the VI 50. FIG. 11 shows the user having selected the "ExcelApplication" automation class from the list of FIG. 10. Thus, the system and method displays an, automation refnum icon which is used to indicate an input type library and automation class.

Below an automation open node is described in detail. In one embodiment, the system and method displays the automation open node icon which is used to indicate the type library and automation class information input from a user, rather than the automation refnum. That is, the automation open node serves the function of the automation refnum by receiving the type library and automation class information from the user and displaying the selected information.

Type Descriptor

Each wire and terminal in a block diagram has an associated data type. The programming environment keeps track of the data type in a structure in memory called a type descriptor. The type descriptor comprises a string of word integers that describe the data type. The generic format of a type descriptor is:

<size> <typecode>.

Table 1 lists three of the supported data types, the type codes, and type descriptors in one embodiment of the programming environment.

TABLE 1

| Data Type | Type Code | Type Descriptor |
| --- | --- | --- |
| Long Integer | 0x03 | 0004 xx03 |
| Handle | 0x31 | 0006 xx31 <kind> |
| Array | 0x40 | <nn> 0x40 <k> <k dimensions> <element type descriptor> |

When a wire is initially connected to a terminal, the wire takes on the data type of the terminal. i.e., the programming environment creates a type descriptor for the wire. When the user connects this wire to another terminal in the block diagram at edit-time, the programming environment performs type propagation checking by comparing the type descriptor of the wire with the type descriptor of the terminal. If the type descriptors do not match, then a type conflict error is generated. In one embodiment, the programming environment performs type propagation checking on each wire and terminal in the block diagram each time a change is made to the diagram. That is, type descriptors are propagated on the wires of the block diagram at edit-time in order to perform type propagation checking.

The method advantageously comprises a new type descriptor for the automation refnum terminal. The automation refnum terminal type descriptor includes an identifier for the automation class associated with the automation refnum and an identifier for the type library for the automation class. In one embodiment, the automation refnum type descriptor has the format:

<size> <RefnumCode> <AutoRefnumKind> <AutomationType> <no of int16's> <kCoClassCLSID> <CLSID of created object> <kTypeLibCLSID> <CLSID of type library> <DISPID>.

The <size> byte of the type descriptor is as described above. The <refnumCode> is the type code for a refnum. The <AutoRefnumKind> value distinguishes this refnum from other refnums as an automation refnum. The <AutomationType> indicates the OLE automation type, such as the <kStOLEAutoType> value which indicates a static OLE automation type. The <no of int16's> field indicates the number of 16 bit words which follow. The <kCoClassCLSID> value indicates the following 128 bits are a class identifier. The <CLSID of created object> is a unique 128 bit number associated with the particular automation class which the automation refnum references. The <kTypeLibCLSID> value indicates the following 128 bits are a type library identifier. The <CLSID of type library> is a unique 128 bit number associated with the particular type library to which the automation class belongs. The <DISPID> is a Dispatch ID, which is a long integer which uniquely specifies a class within a type library. The Dispatch ID is associated with the Microsoft Dispatch interface for dispatch methods and properties. The Dispatch ID is unique within a type library. In the example shown in FIG. 11, the type descriptor provided by the automation refnum includes information to specify the Microsoft "Excel" automation application type library and the "Application" automation class.

The automation nodes comprise a type propagation checking method which may be invoked by the block diagram editor 64 to perform type propagation checking. When the user connects a wire to a terminal of an automation node, the type propagation method of the node is invoked and the type descriptor of the wire being connected to the terminal is passed as an argument to the type propagation method. This information in the type descriptor enables the type propagation method to advantageously determine class conflicts in the block diagram.

Thus, the method advantageously performs type propagation checking to determine program correctness when wiring automation function nodes. This checking advantageously prevents run-time errors which would occur when the user attempted to invoke a method or property which is invalid for the automation class selected. Type propagation checking is discussed further below.

The user creates an automation open node for instantiating an object from the automation class referred to by the automation refnum. Preferably, the user drags an automation open node from the automation nodes palette of FIG. 5 and drops the automation open node on the block diagram.

In response to the user dropping the automation open node on the block diagram, the block diagram editor 64 displays an automation open node in the block diagram, as shown in FIG. 11, in step 94. Preferably, the block diagram editor 64 invokes a draw method of the automation open node to display an automation open node icon in the block diagram. At run-time, the automation open node instantiates an object based on the automation class and type library information received from the automation refnum.

The system then connects the automation refnum to the automation open node in response to user input. The user wires the automation open node to the automation refnum using a wiring tool. In response, the block diagram editor 64 displays a wire connecting the automation open node and the automation refnum in step 96. The automation refnum provides the automation class and type library information to the automation open node so that the automation open node may perform type propagation checking.

The automation open node includes a refnum input terminal which is designed to receive an output from an automation refnum icon. In an embodiment where an automation refnum icon is not used to designate class and type library information, the automation open node receives the class and type library information by other means, preferably via user input in a similar manner which the automation refnum received the class and type library information. At edit-time, the automation open node receives a type descriptor on the wire, such as from the automation refnum, which includes type library and automation class information. The automation open node also includes a refnum output terminal, to which a wire may be connected. At edit-time, the automation open node forwards the type descriptor received at its refnum input terminal to the refnum output terminal. The type descriptor is forwarded on a connected wire to all other nodes connected to the wire.

At run-time, the automation open node provides a reference to the object instantiated by the automation open node on the wire connected to the refnum output terminal. Automation nodes, such as automation invoke nodes and automation property nodes, receive the object reference in order to invoke methods and properties of the object as will be described below.

Figure 12:
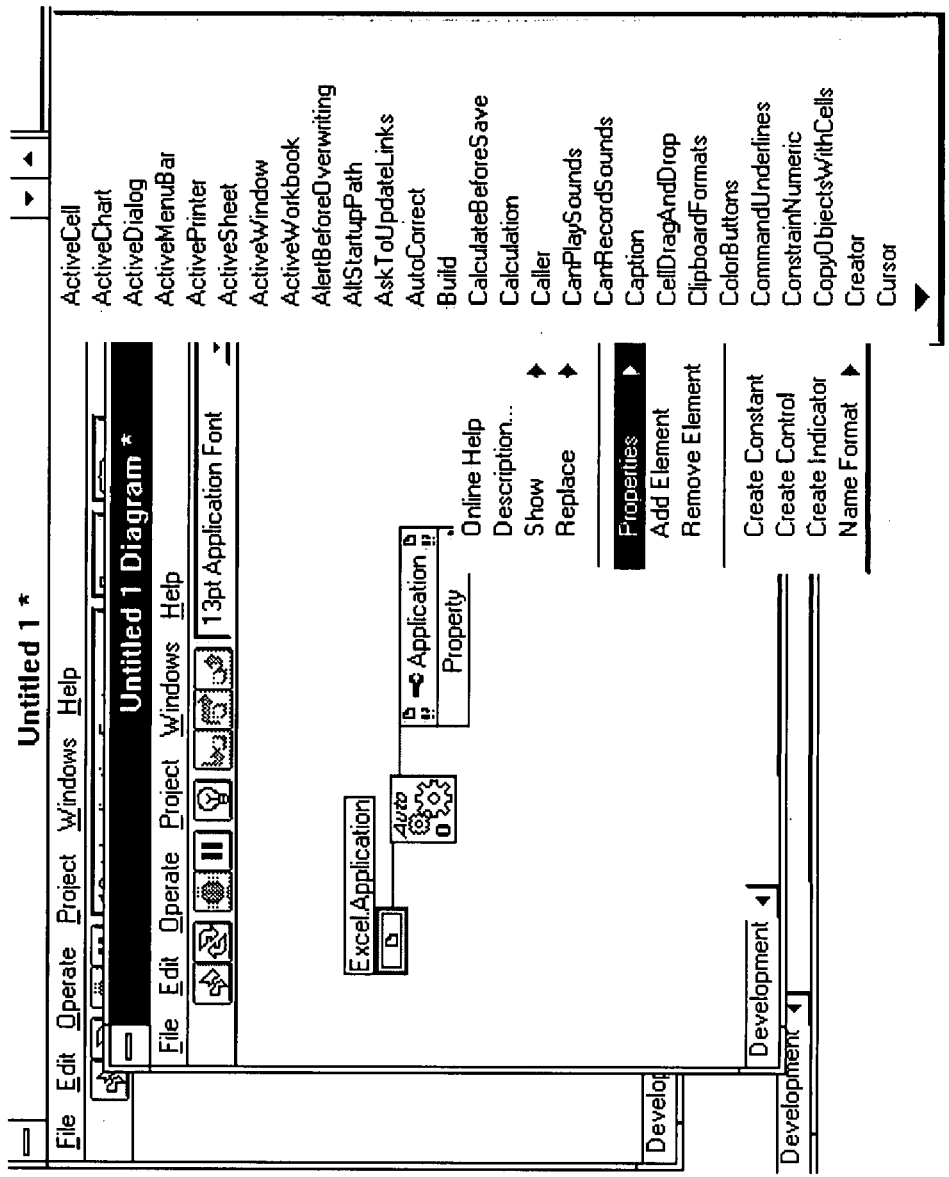
FIG. 12 is a screen shot illustrating an automation property node wired to the automation open node of FIG. 11 and a list of properties of the automation class which was chosen in FIG. 11.

The user creates an automation property node in order to invoke properties, i.e., to set or get properties, of the object instantiated by the automation open node. Preferably, the user drags an automation property node from the automation nodes palette of FIG. 5 and drops the automation property node on the block diagram, as shown in FIG. 12. The user may also create an automation property node via the pop-up menu of the automation open node.

In response to the user dropping the automation property node, the block diagram editor 64 invokes a method on the automation property node to display an automation property node icon in the block diagram in step 98*a*. The automation property node is used to invoke properties of the object. The properties to be invoked by the automation property node are selected by the user creating the VI 50.

The user wires the automation property node to the automation open node using a wiring tool. The automation property node includes a refnum input terminal through which the automation property node receives an object reference and type descriptor. In response to the user wiring the automation property node and the automation open node, the block diagram editor 64 displays a wire connecting the refnum input terminal of the automation property node and the refnum output terminal of either the automation open node or an automation invoke node in step 100*a*.

It is noted that the refnum input terminal of the automation property node may instead be connected to other wires which provide the reference to the object and type descriptor rather than the automation open node refnum output terminal. For example, the refnum input terminal of the automation property node may be connected to the refnum output terminal of another automation property node of the same object or to the refnum output terminal of an automation invoke node of the same object.

At run-time, the automation property node receives a reference to the instantiated object via its refnum input terminal so that the automation property node may set or get properties of the instantiated object.

At edit-time, the automation property node receives a type descriptor via its refnum input terminal so that the automation property node may perform type propagation checking. The automation property node also uses the information in the type descriptor at edit-time to perform other operations, such as displaying property lists as described below.

The automation property node also includes a refnum output terminal. The automation property node passes the information received on its refnum input terminal to its refnum output terminal, i.e., the type descriptor, at edit-time and the object reference at run-time.

Preferably, the user selects the "Properties" menu item from the automation property node pop-up menu in order to view a list of properties associated with the automation class, as shown in FIG. 12. In response to the user selecting the Properties item, the automation open node (or other automation node) provides information on the selected automation class and selected type library to the automation property node in step 102. Preferably, providing information on the automation class and selected type library includes providing a type descriptor which includes the information.

Using the automation class and type library information, the automation property node queries the object manager 68 for a list of properties associated with the selected automation class in step 103. In response, the object manager 68 queries the selected type library for a list of properties of the specified automation class in step 104. The object manager 68 receives the list of properties from the type library and provides the list to the automation property node. The automation property node uses the information received from the object manager 68 to display the list of properties of the selected automation class, as shown in FIG. 12, in step 105.

Figure 13:
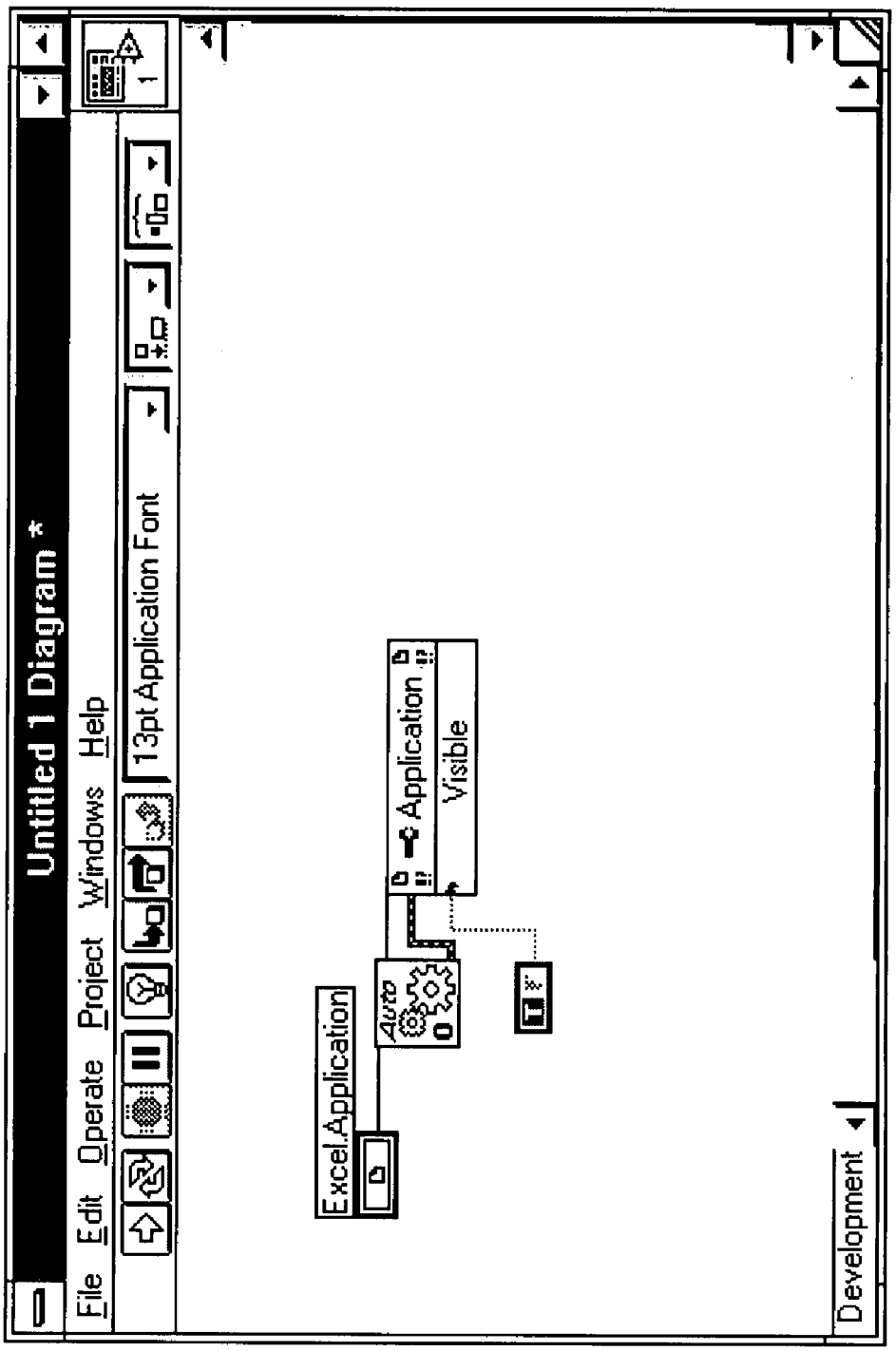
FIG. 13 is a screen shot illustrating a property having been chosen for the automation property node of FIG. 12.

The user selects one of the properties in the displayed list of properties. In response to the user selection, the automation property node selects the selected property to be invoked by the automation property node in step 106*a*. The automation property node displays the selected property in the automation property node, as shown in FIG. 13, in step 108. FIG. 13 shows a "Visible" property displayed in the Excel Application automation property node.

The automation property node displays a terminal for the selected property, as shown in FIG. 13, in step 110. If the property may be set, i.e., written, the automation property node displays an input terminal. If the property may be gotten, i.e., read, the automation property node displays an output terminal. Preferably, a property may be set to be readable or writable in response to user input. In FIG. 13, the Visible property includes an input terminal since the property may be set, i.e., changed. The Visible property input terminal receives a Boolean, i.e., True/False, input value which may be toggled on the front panel in response to user input.

In a similar manner, the user is enabled to add more properties to the automation property node for the purpose of invoking the properties of the object. Typically, the properties are set via controls on the front panel associated with the block diagram or gotten and displayed on indicators on the front panel. In addition, the properties may be invoked programmatically using nodes and terminals of the VI 50.

Figure 14:
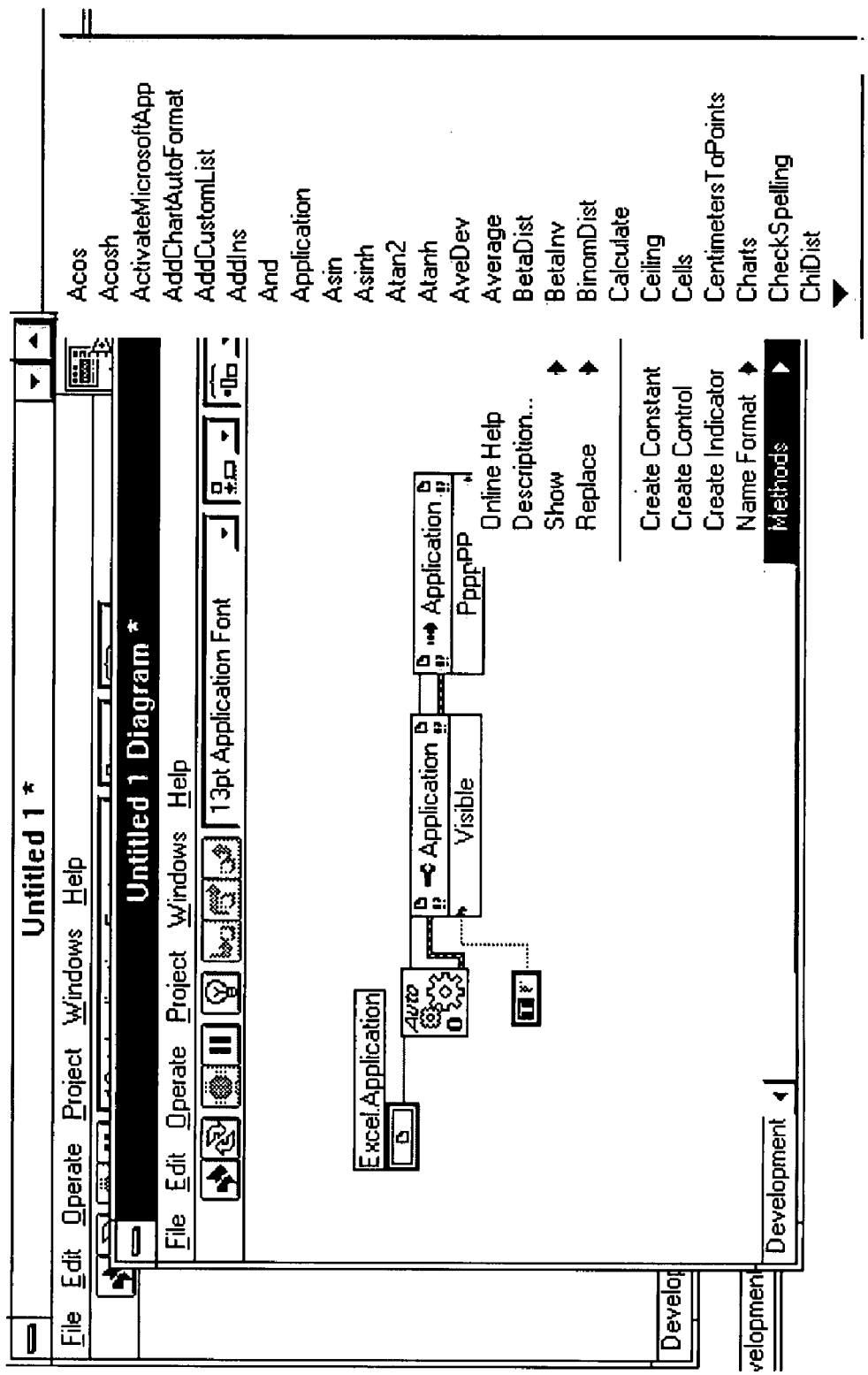
FIG. 14 is a screen shot illustrating an automation invoke node wired to the automation property node of FIG. 12 and a list of methods of the automation class which was chosen in FIG. 12.

The user creates an automation invoke node in order to invoke methods of the object instantiated by the automation open node. Preferably, the user drags an automation invoke node from the automation nodes palette of FIG. 5 and drops the automation invoke node on the block diagram, as shown in FIG. 14. The user may also create an automation invoke node via the pop-up menu of the automation open node.

In response to the user dropping the automation invoke node, the block diagram editor 64 invokes a method on the automation invoke node to display an automation invoke node icon in the block diagram in step 98b. The automation invoke node is used to invoke methods of the object. The methods to be invoked by the automation invoke node are selected by the user creating the VI 50.

The user wires the automation invoke node to the automation open node using a wiring tool. The automation invoke node includes a refnum input terminal through which the automation invoke node receives an object reference and type descriptor. In response to the user wiring the automation invoke node and the automation open node, the block diagram editor 64 displays a wire connecting the refnum input terminal of the automation invoke node and the refnum output terminal of either the automation open node or an automation property node in step 100b.

It is noted that the refnum input terminal may instead be connected to other wires which provide the reference to the object and type descriptor rather than the automation open node refnum output terminal. For example, the refnum input terminal of the automation invoke node may be connected to the refnum output terminal of another automation invoke node of the same object or to the refnum output terminal of an automation property node of the same object.

At run-time, the automation invoke node receives a reference to the instantiated object via its refnum input terminal so that the automation invoke node may invoke methods of the instantiated object.

At edit-time, the automation invoke node receives a type descriptor via its refnum input terminal so that the automation invoke node may perform type propagation checking. The automation invoke node also uses the information in the type descriptor at edit-time to perform other operations, such as displaying method lists as described below.

The automation invoke node also includes a refnum output terminal. The automation invoke node passes the information received on its refnum input terminal to its refnum output terminal, i.e., the type descriptor, at edit-time and the object reference at run-time.

Preferably, the user selects the "Methods" menu item from the automation invoke node pop-up menu in order to view a list of invoke associated with the automation class, as shown in FIG. 14. In response to the user selecting the Methods item, the automation open node (or other automation node) provides information on the selected automation class and selected type library to the automation invoke node in step 116. Preferably, providing information on the automation class and selected type library includes providing a type descriptor which includes the information.

Using the automation class and type library information, the automation invoke node queries the object manager 68 for a list of methods associated with the selected automation class in step 117. In response, the object manager 68 queries the selected type library for a list of methods of the specified automation class in step 118. The object manager 68 receives the list of methods from the type library and provides the list to the automation invoke node. The automation invoke node uses the information received from the object manager 68 to display the list of methods of the selected automation class, as shown in FIG. 14, in step 119.

Figure 15:
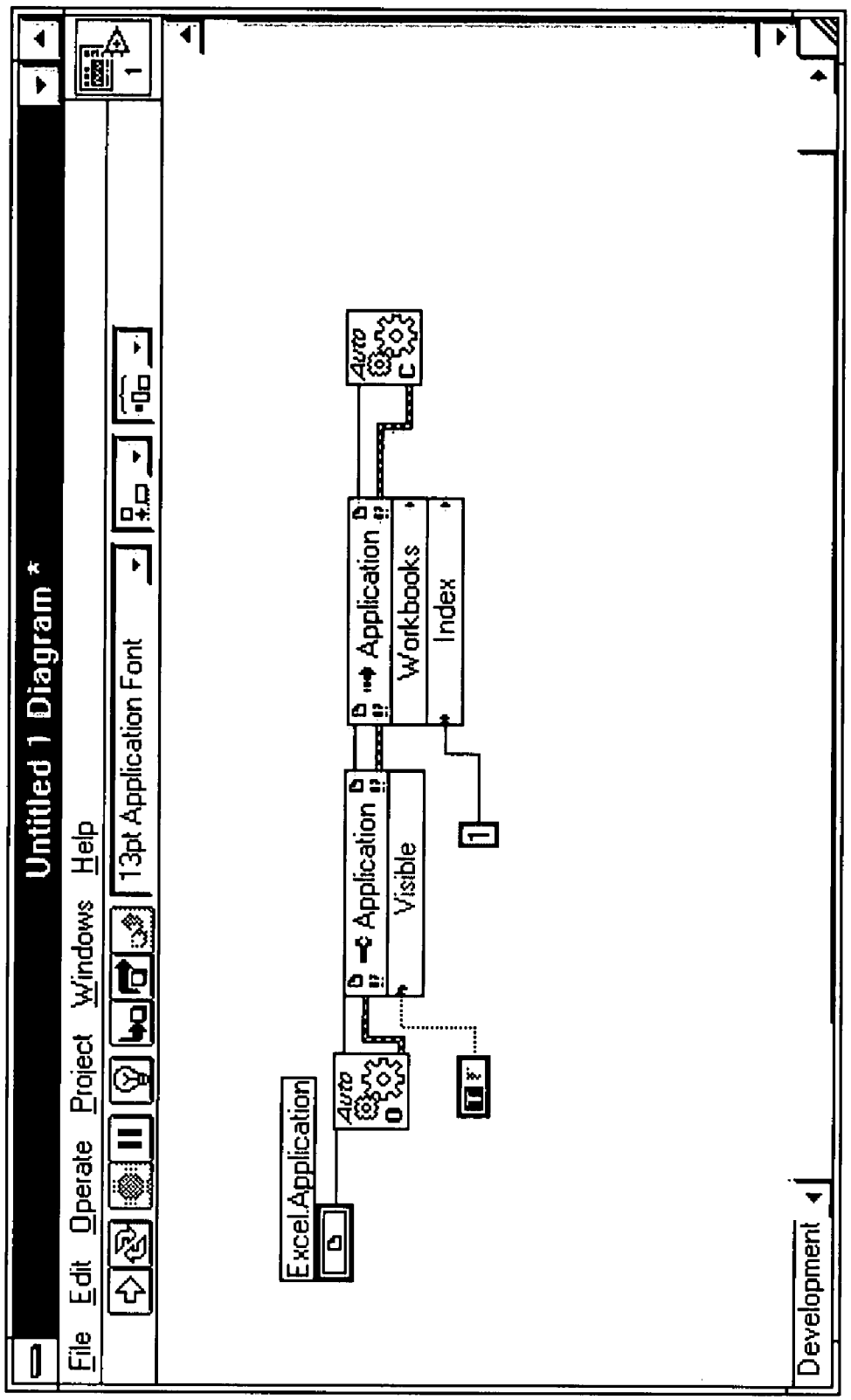
FIG. 15 is a screen shot illustrating a method having been chosen for the automaton invoke node of FIG. 14.

The user selects one of the methods in the displayed list of methods. In response to the user selection, the automation invoke node selects the selected method to be invoked by the automation invoke node in step 106b. The automation invoke node displays the selected method in the automation invoke node, as shown in FIG. 15, in step 122. FIG. 15 shows a "Workbooks" method displayed in the Excel Application automation invoke node.

The automation invoke node displays a terminal for each of the parameters of the selected method, as shown in FIG. 15, in step 124. If the method includes input parameters, the automation invoke node displays an input terminal for each input parameter. If the includes output parameters, the automation invoke node displays an output terminal for each of the output parameters. In FIG. 15, the Workbooks method includes an "Index" parameter. An input terminal and an output terminal are displayed for the Index parameter since it is both an input and output parameter. The Index input terminal receives an integer input value which may be specified on the front panel in response to user input. In addition, the Workbooks method returns an output parameter, and FIG. 15 displays an output terminal for the Workbooks method.

FIG. 15 also shows an automation close node wired to the automation invoke node for freeing, i.e., deconstructing, the instantiated object at run-time referenced on the wire connecting the automation invoke node refnum output terminal and the automation close node refnum input terminal.

It is noted that the order in which an automation refnum, an automation open node, an automation property node, and an automation invoke node are dropped, wired, and configured is not fixed. For example, the automation open node could be dropped first. The automation open node includes a "Configure" item in its pop-up menu which automatically creates a configured automation control and associated automation refnum, and wires the automation refnum output terminal to the automation open node refnum input terminal. In another example, an automation property node and an automation invoke node may be wired together in "parallel". That is, the automation refnum input terminal of each of an automation invoke node and an automation property node may be wired to the same wire emanating from the automation refnum output terminal of an automation open node.

Furthermore, a graphical automation client may be created with just an automation invoke node and no automation property node or a graphical automation client may be created with just an automation property node and no automation invoke node. That is, steps 98a through 110, and steps 126 and 128 could be performed without steps 98b through 124 being performed. Likewise, steps 98b through 128 could be performed without steps 98a through 110 being performed.

Once the user has created the VI 50, the user instructs the graphical programming environment to construct execution instructions in accordance with the nodes in the block diagram in step 126. Preferably, constructing the execution instructions comprises generating machine language instructions into an executable program. Alternatively, constructing the execution instructions comprises generating programming language instructions, such as C language instructions, and compiling the programming language instructions into an executable program. In one embodiment, the user causes the execution instructions to be generated by clicking on the run button, indicated by a double wide right-pointing arrow at the far left of the toolbar of the front panel of FIG. 15. In addition, the user causes the execution instruction to be generated by saving the virtual instrument to a file via the File pull-down menu of FIG. 15.

Constructing the execution instructions includes invoking code generation methods for each of the automation nodes. The automation open node generates instructions to instantiate an object from the automation class indicated by the automation refnum. Preferably, the automation class and type library information is included in the execution instructions generated by the automation open node. The automation property node generates instructions for invoking the properties of the automation property node. The instructions set properties according to the values supplied at corresponding property input terminals and get property values and provide the values to corresponding output terminals. The automation invoke node generates instructions for invoking the selected method of the automation invoke node. The instructions invoke the method with the values supplied at the parameter input terminals and supply return values at the output terminals.

Once the execution instructions have been generated, the user directs the environment to execute the execution instructions. In response, the execution subsystem 56 (of FIG. 3) executes the execution instructions of the VI 50 in step 128. Preferably the user clicks the run button, or selects the run menu item from the Operate menu of FIG. 15, to execute the execution instructions. In one embodiment, the execution instructions are interpreted rather than compiled.

Thus, the method enables a user to create an automation client application by means of a graphical programming environment to instantiate objects from automation classes and invoke methods and properties of the automation objects.

Context-Sensitive Help Display

Figure 16:
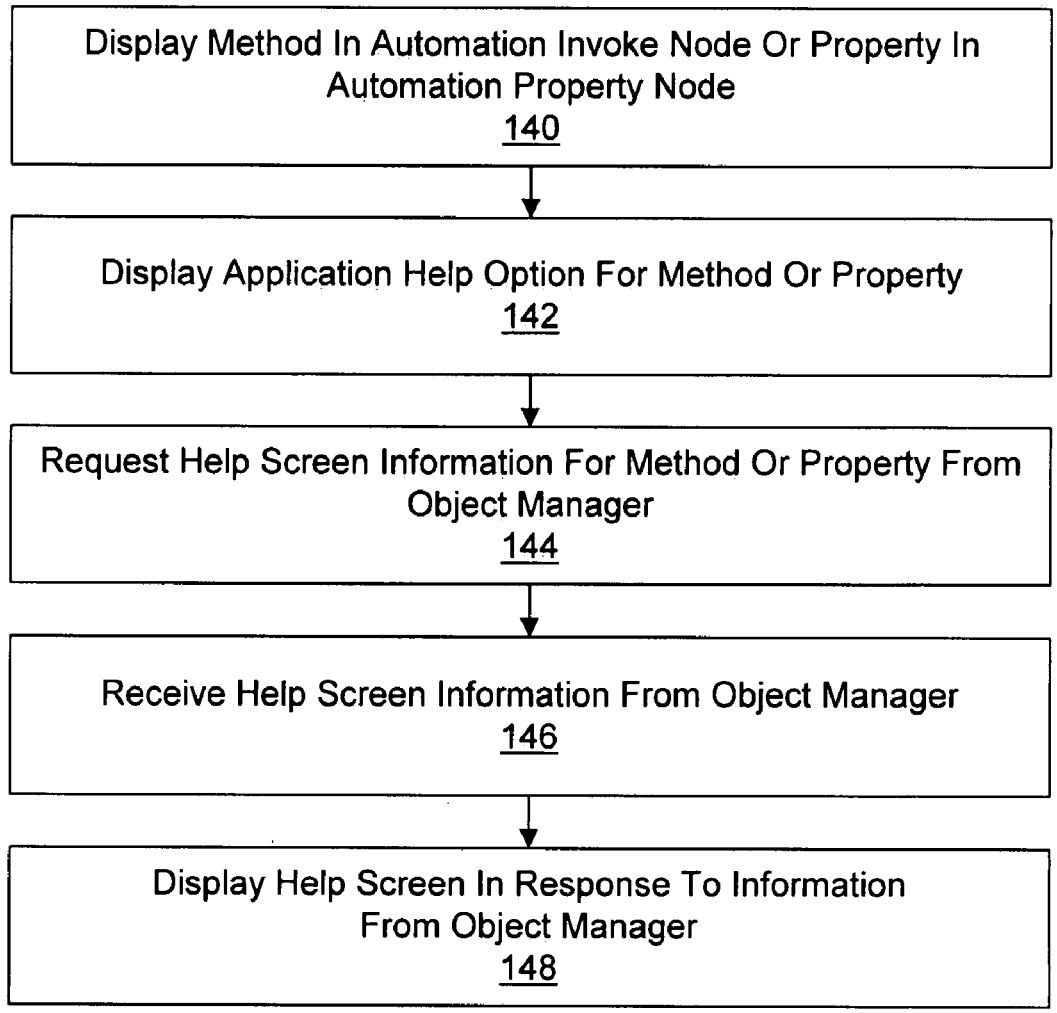
FIG. 16 is a flowchart illustrating steps taken to display an application help screen for an automation object according to the preferred embodiment of the present invention.
Figure 17:
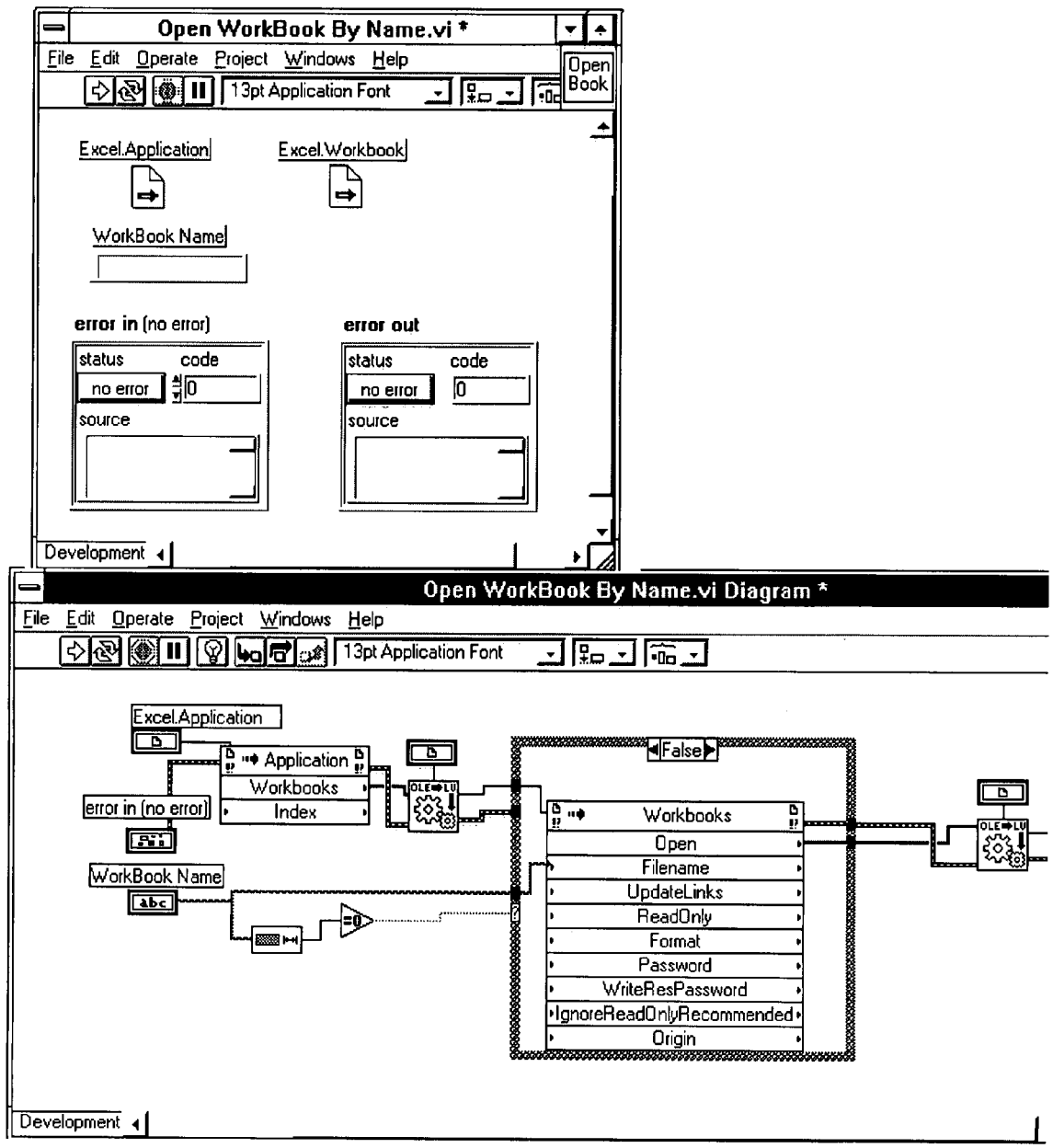
FIG. 17 is a screen shot illustrating the step of displaying a method of an automation invoke node according of the flowchart of FIG. 16.

Referring now to FIG. 16, a flowchart illustrating steps taken to display an application help screen for an automation object according to the preferred embodiment is shown. A user creates a VI, such as the VI 50 of FIG. 3, according to the steps of the flowchart of FIG. 6. The VI includes an automation invoke node and/or an automation property node, referred to generically as an automation node. The block diagram editor 64 displays a method in an automation invoke node or a property in an automation property node, as shown in FIG. 17, in step 140. In particular, FIG. 17 shows a "Workbooks" method of "Application" automation class from the type library of an "Excel" automation server, i.e., an automation application.

Figure 18:
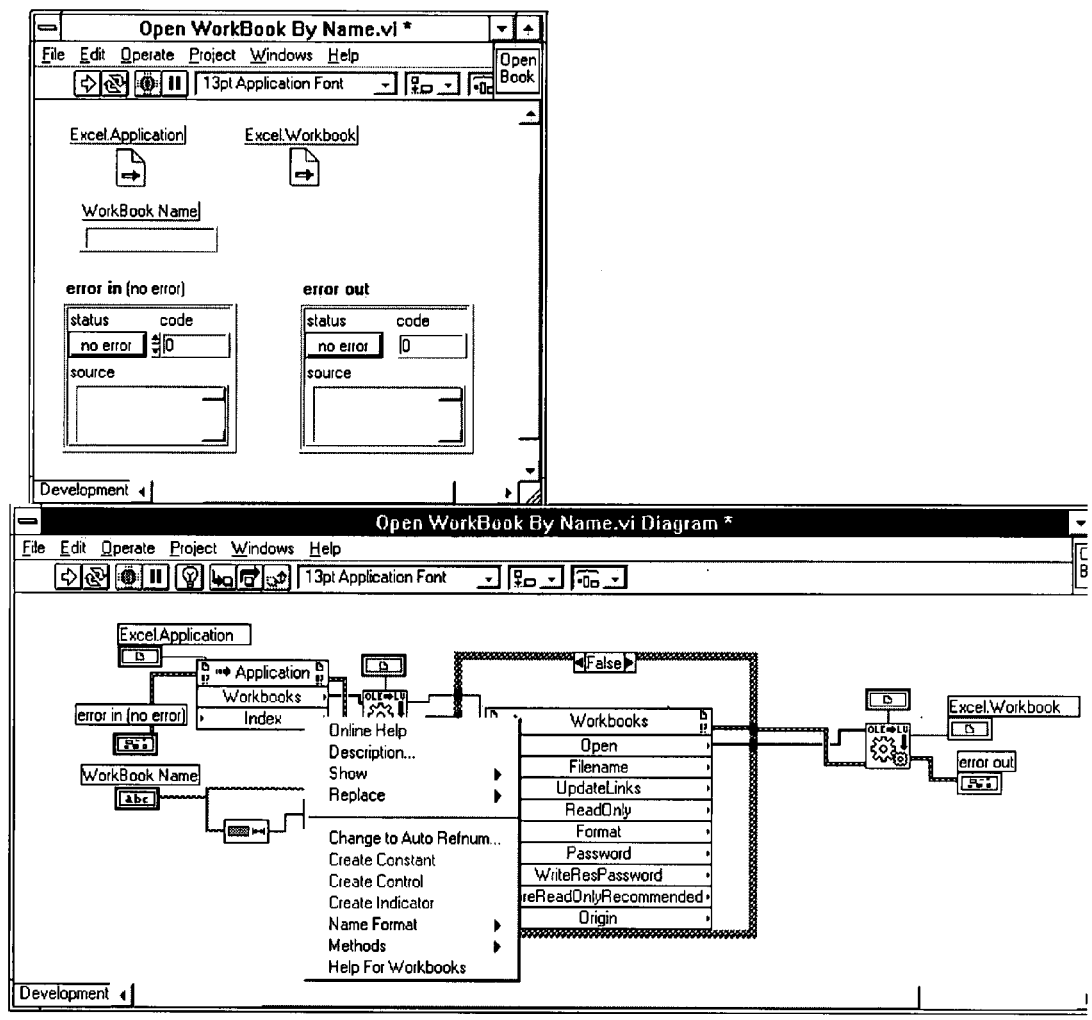
FIG. 18 is a screen shot illustrating the step of displaying an application help option for a method of an automation invoke node according of the flowchart of FIG. 16.

The user provides user input, preferably right-clicking with a mouse on the automation node, to view a pop-up menu. In response to the user input, the automation node displays an application help option for the method/property indicated by the user input, as shown in FIG. 18, in step 142. Preferably, displaying an application help option includes displaying a pop-up menu with a help item. In FIG. 18 the help item is the "Help for Workbooks" item.

The user selects the help item, preferably by clicking on the help item with a mouse. In response to the user selection of the help item, the automation node requests help screen information for the method/property from the object manager 68 (of FIG. 3) in step 144. The automation node passes information specifying the method/property to the object manager 68. The object manager 68 returns the requested information.

Figure 19:
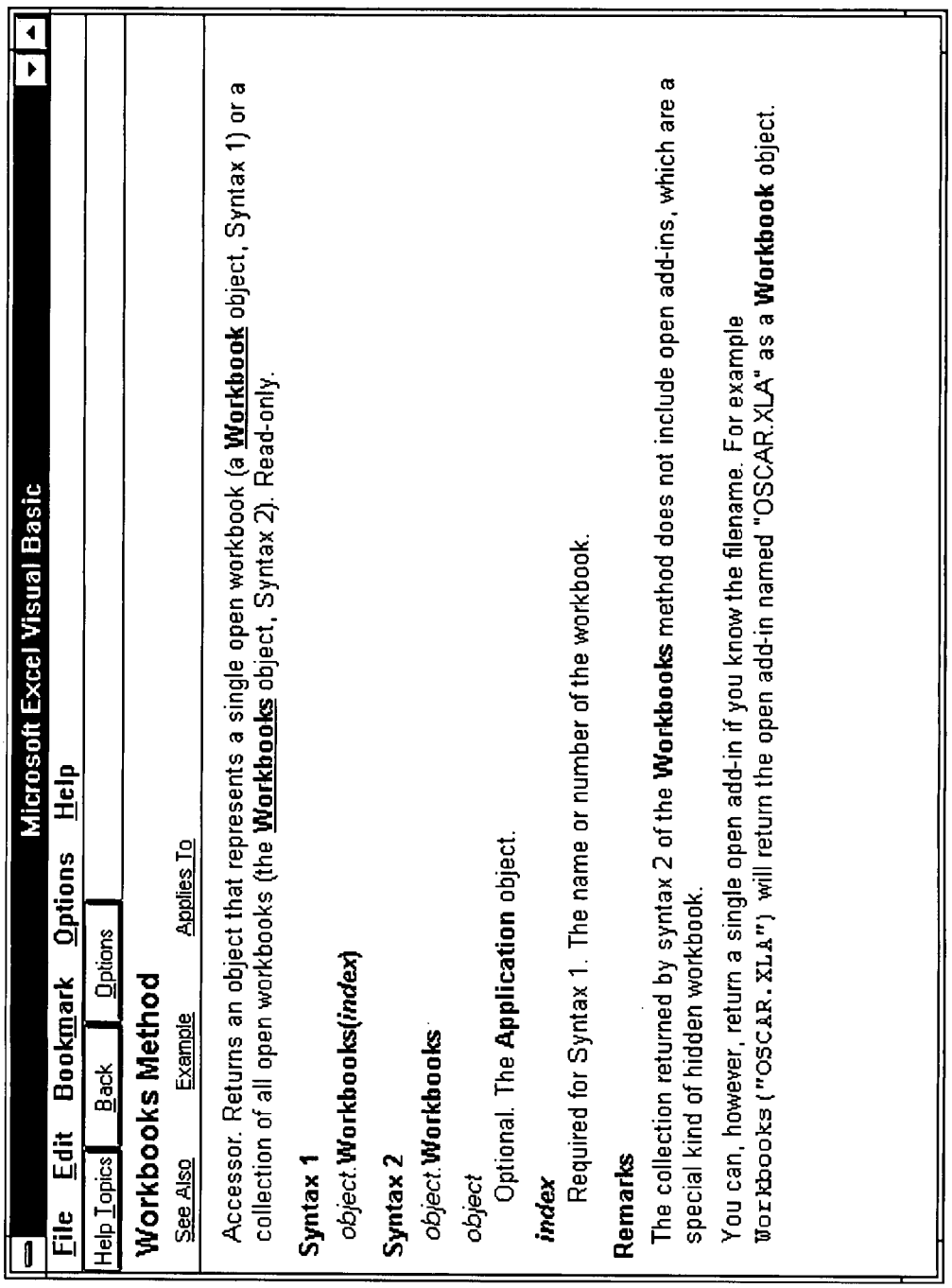
FIG. 19 is a screen shot illustrating the step of displaying a application help screen of the flowchart of FIG. 16.

The automation node receives the requested information from the object manager 68 in step 146. Preferably, the requested information includes context for the method or object and a reference to a help file which includes the help screen to be displayed. In response to receiving the requested information, the automation node displays a help screen for the method/property, as shown in FIG. 19, in step 148. FIG. 19 shows a help screen for the Excel Application Workbooks method. It is noted that the same steps apply for a property as for a method even though the steps have been illustrated via screen shots with reference to a method.

Thus, the method provides a useful means for providing context sensitive help information for a user creating an automation client by means of the graphical programming environment.

In one embodiment, automation classes and methods and/or properties of the classes are dynamically specified. Preferably, the classes and methods are specified via a front panel control. The alternate embodiment is advantageous in circumstances wherein it is desired to access an automation server application which does not publish a type library. The type descriptor for the dynamically specified automation class and method and/or property embodiment includes an indication of a dynamic automation type.

Class Propagation

Figure 20:
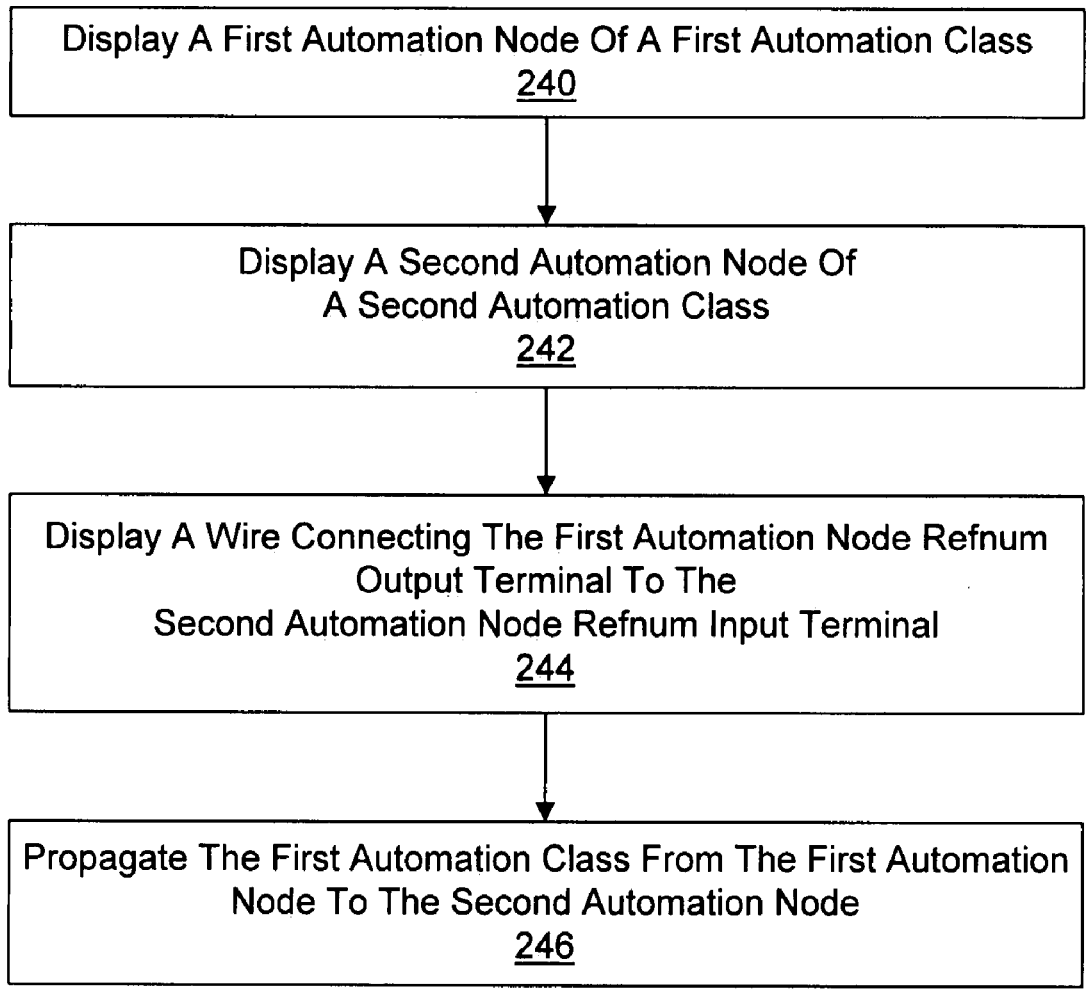
FIG. 20 is a flowchart illustrating steps taken to propagate the automation class of an automation node to another automation node.
Figure 21:
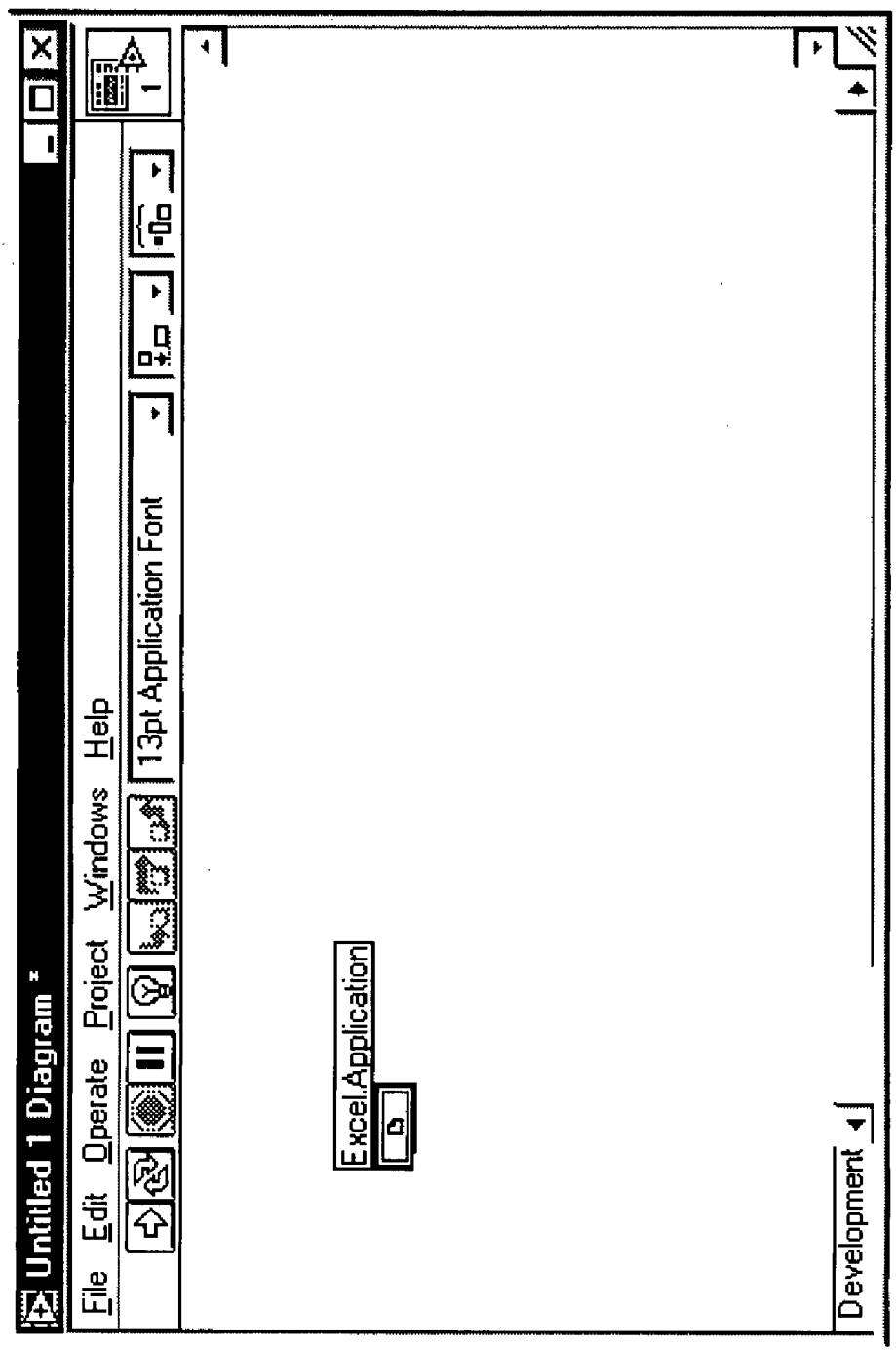
FIGS. 21 through 23 are screen shots illustrating steps of the flowchart of FIG. 20.

Referring now to FIG. 20, a flowchart illustrating steps taken to propagate the automation class of an automation node to another automation node is shown. In response to a user dropping a first automation node in a VI block diagram, the block diagram editor 64 invokes a method of the first automation node to display the first automation node in step 240, as shown in FIG. 21. In response to a user dropping a second automation node in a VI block diagram, the block diagram editor 64 invokes a method of the second automation node to display the second automation node in step 242.

The first automation node is one of an automation open node, an automation invoke node, an automation property node, and an automation refnum. The second automation node is one of an automation open node, an automation invoke node, an automation property node, and an automation close node. Each of the automation nodes, has a refnum input terminal and a refnum output terminal for receiving and providing, respectively, a type descriptor which includes an automation class identifier and a type library identifier which the automation class is in. However, the automation refnum only has a refnum output terminal and the automation close node only has a refnum input terminal.

Figure 28:
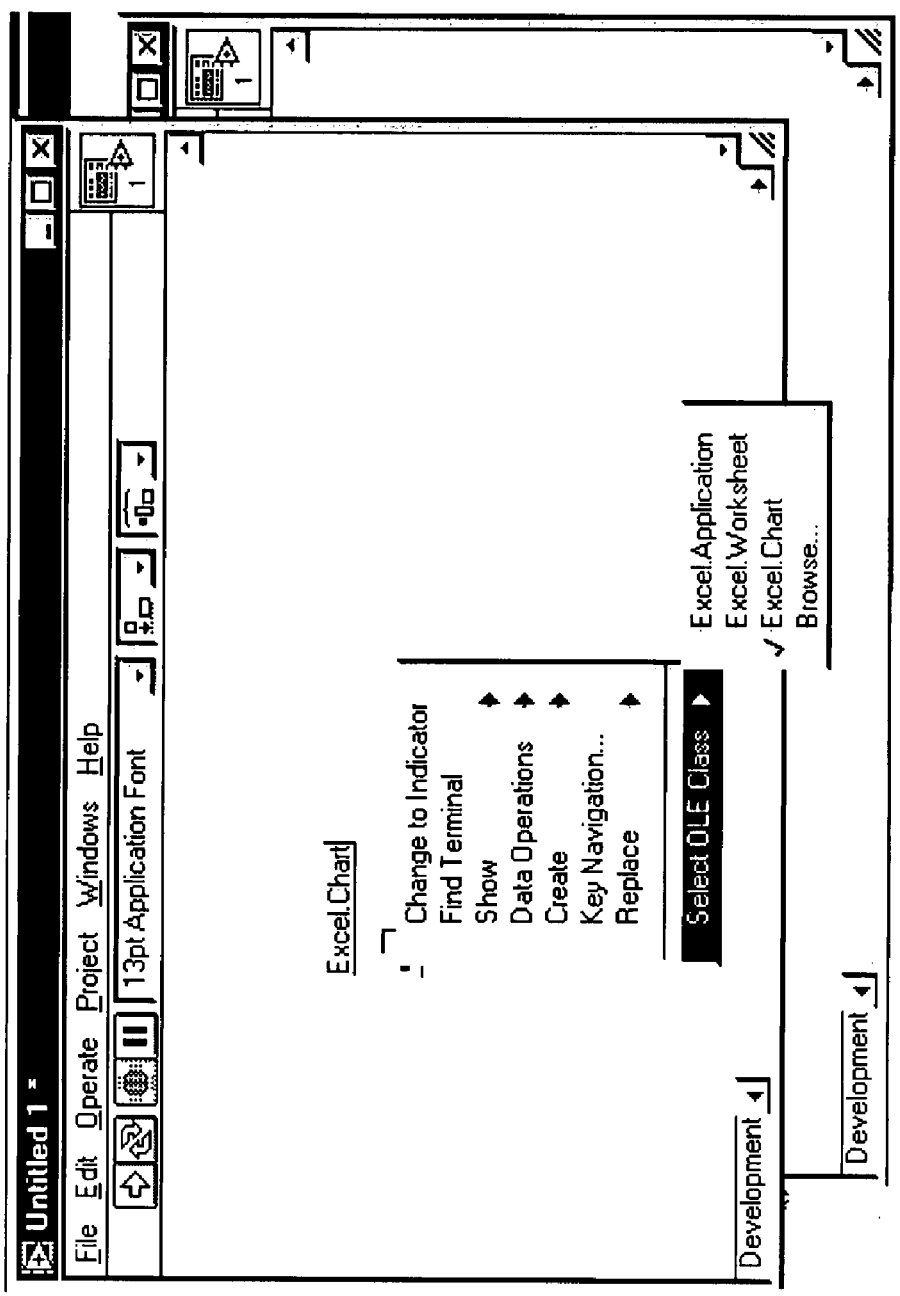
FIGS. 28 through 30 are screen shots illustrating steps of the flowchart of FIG. 27.

The first automation node has a first automation class and the second automation node has a second automation class. The first and second automation classes may be the same or different. The automation class of each of the first and second automation nodes is set either by default when the automation node is dropped or directly by the user, preferably using the "Select OLE Class" item in the automation node pop-up menu, as shown in FIG. 28.

In response to a user wiring the first and second automation nodes together, the block diagram editor 64 displays a wire connecting the refnum output terminal of the first automation node to the refnum input terminal of the second automation node in step 244. In response to the user wiring the first and second automation nodes together, the automation class of the first automation node is propagated to the second automation node in step 246. That is, the second automation node receives the first automation class in the type descriptor from the first automation node and changes the automation class of the second automation node to the first automation class if the second automation class is different from the first automation class.

Figure 22:
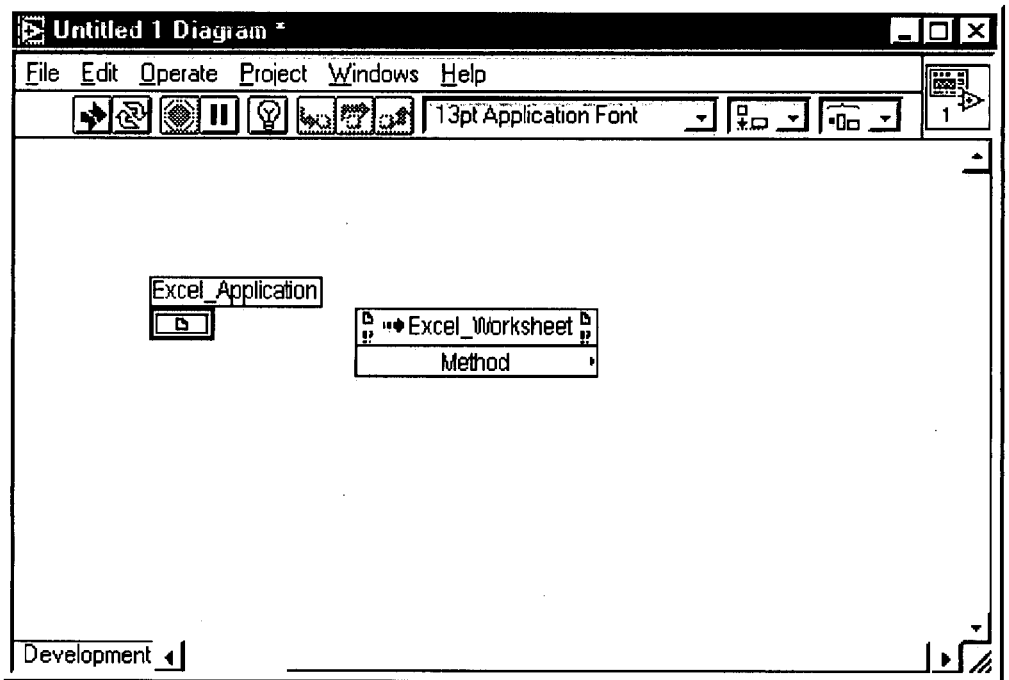
Figure 23:
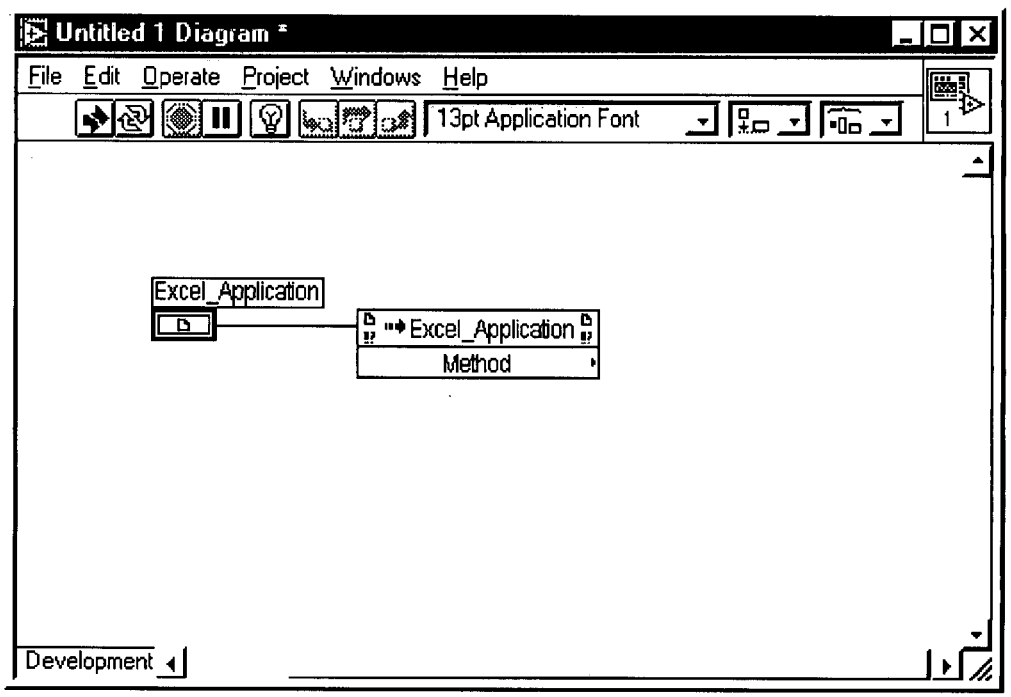

FIG. 22 shows first and second automation nodes prior to being wired together and FIG. 23 shows the automation nodes after being wired together, i.e., after the automation class propagation has occurred. It is noted that the class of the second automation node is now the same as the class of the first automation node.

Figure 24:
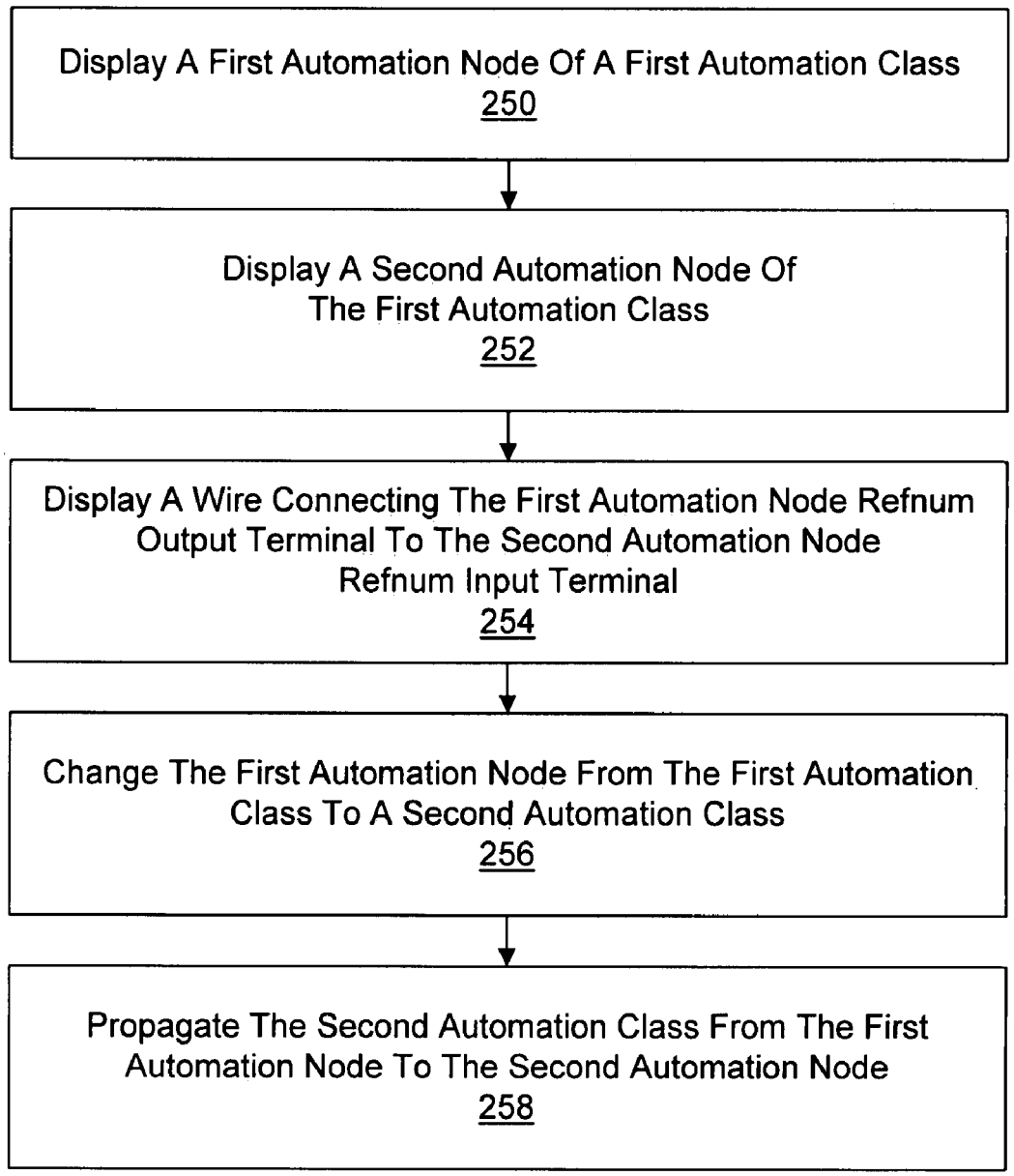
FIG. 24 is a flowchart illustrating steps taken to propagate the automation class of an automation node to another automation node.

Referring now to FIG. 24, a flowchart illustrating steps taken to propagate the automation class of an automation node to another automation node is shown. In response to a user dropping a first automation node in a VI block diagram, the block diagram editor 64 invokes a method of the first automation node to display the first automation node in step 250. In response to a user dropping a second automation node in a VI block diagram, the block diagram editor 64 invokes a method of the second automation node to display the second automation node in step 252.

The first automation node is one of an automation open node, an automation invoke node, an automation property node, and an automation refnum. The second automation node is one of an automation open node, an automation invoke node, an automation property node, and an automation close node. Each of the automation nodes, has a refnum input terminal and a refnum output terminal for receiving and providing, respectively, a type descriptor which includes an automation class identifier and a type library identifier which the automation class is in. However, the automation close node only has a refnum input terminal and the automation refnum has either only a output terminal or an input terminal depending upon whether or not it is a control or an indicator, respectively.

The first and second automation nodes have a first automation class. The automation class of each of the first and second automation nodes is set either by default when the automation node is dropped or directly by the user, preferably using "Select OLE Class" item in the automation node pop-up menu, as shown in FIG. 28. In addition, the automation class of the automation nodes may have previously been set via the class propagation steps described in the flowcharts of FIG. 20 or FIG. 24.

In response to a user wiring the first and second automation nodes together, the block diagram editor 64 displays a wire connecting the refnum output terminal of the first automation node to the refnum input terminal of the second automation node in step 254.

In response to a user requesting to change the first automation node to a second automation class, the first automation node changes the automation node to be of the second automation class in step 256.

In response to the user changing the first automation node to a second automation class, the automation class of the first automation node is propagated to the second automation node in step 258. That is, the second automation node receives the second automation class in the type descriptor from the first automation node and changes the automation class of the second automation node to the second automation class if the second automation class is different from the first automation class.

Figure 25:
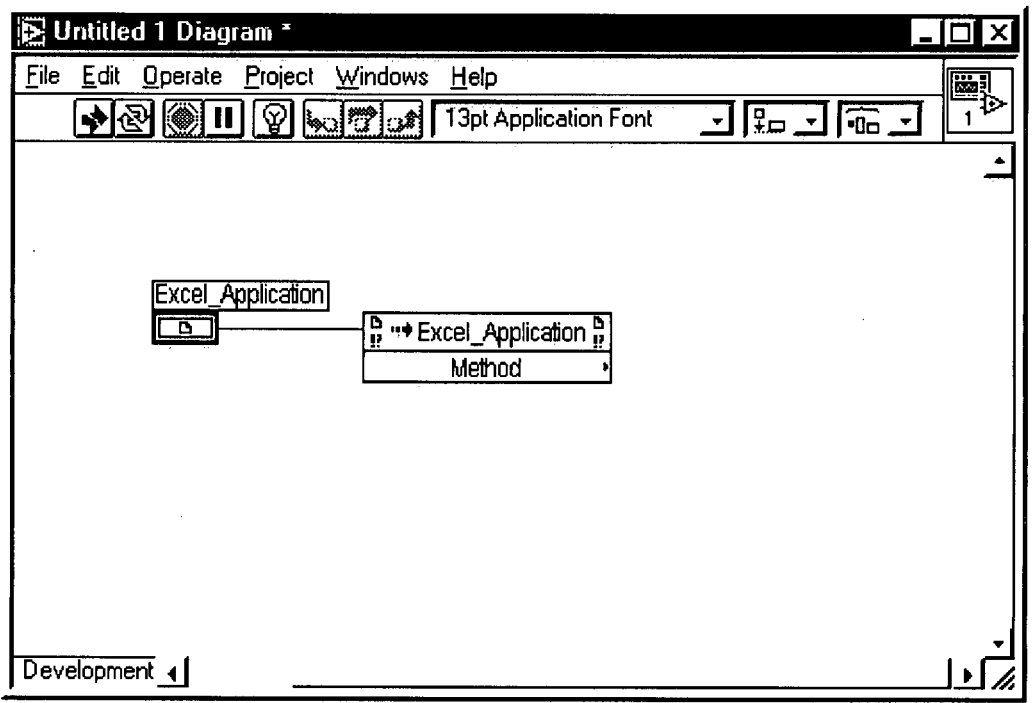
FIGS. 25 and 26 are screen shots illustrating steps of the flowchart of FIG. 24.
Figure 26:
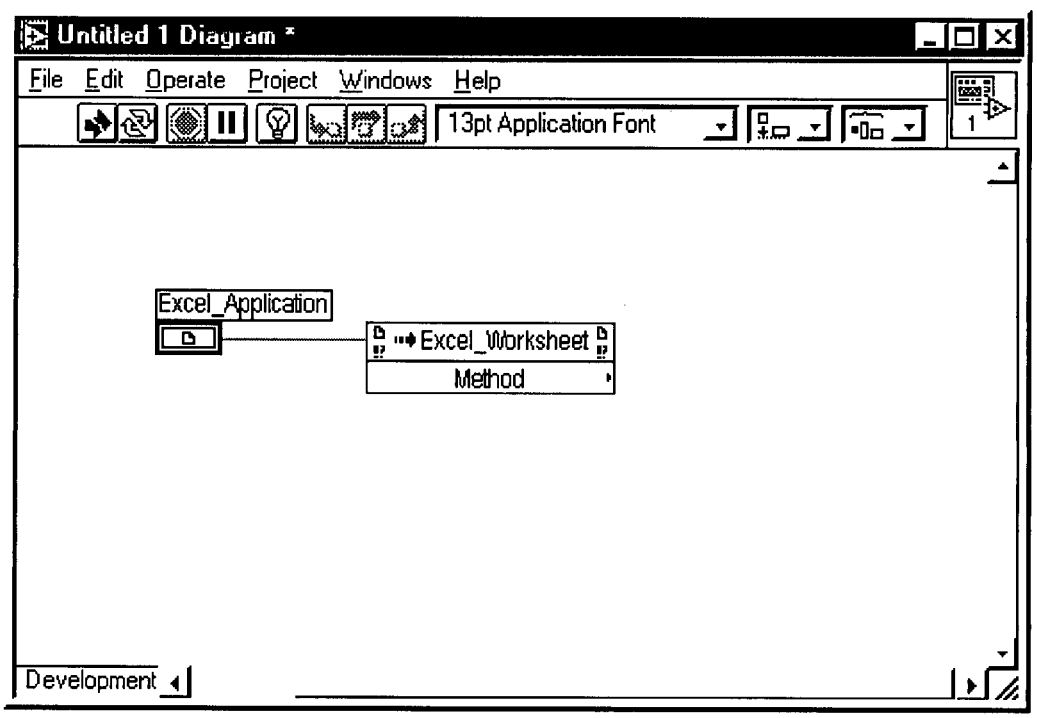

FIG. 25 shows first and second automation nodes prior to changing the first automation node to be of the second automation class and FIG. 26 shows the automation nodes after changing the first automation node to be of the second automation class, i.e., after the automation class propagation has occurred. It is noted that the class of the second automation node is now the same as the class of the first automation node.

Type Propagation Checking

Figure 27:
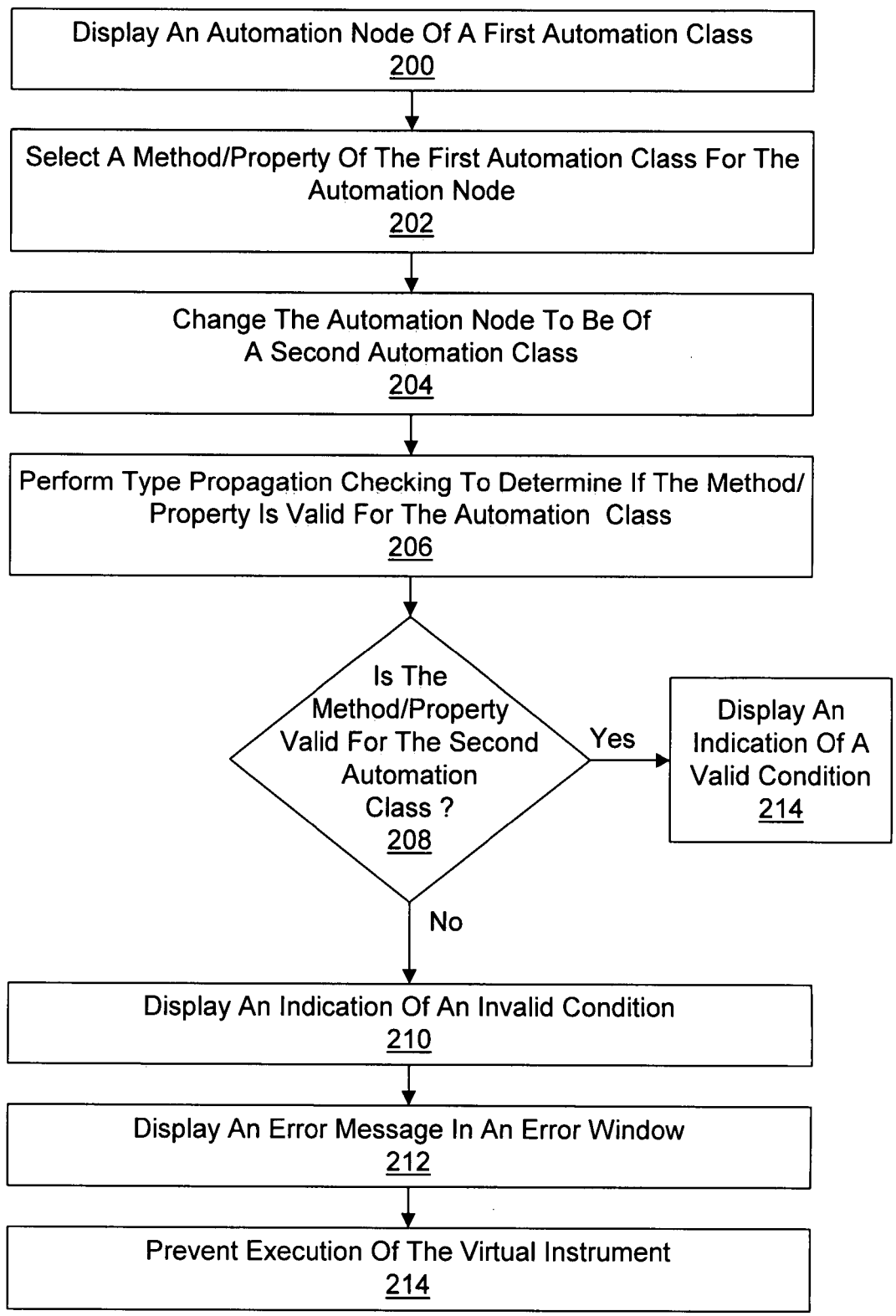
FIG. 27 is a flowchart illustrating steps taken to perform type propagation checking of automation nodes.

Referring now to FIG. 27, a flowchart illustrating steps taken to perform type propagation checking of automation invoke nodes and automation property nodes is shown. In general, the method described in FIG. 27 applies to both automation invoke nodes and automation property nodes, with differences noted. Hence, for clarity, an automation invoke node and an automation property node are referred to generically as an automation node with respect to FIGS. 27 through 35. Likewise, the method of an automation invoke node and the properties of an automation property node are referred to as method/property where either apply.

A user creates an automation node, i.e., an automation invoke node or an automation property node, in order to invoke methods/properties of an object instantiated from an automation class. Preferably, the user drags an automation node from the automation nodes palette of FIG. 5 and drops the automation node in a block diagram.

In response to the user dropping the automation node in the block diagram, the block diagram editor 64 invokes a method on the automation node to display an automation node icon in the block diagram, in step 200.

The automation node displayed has an associated first automation class associated with it. In one case, the first automation class is a default automation class. In another case, the first automation class is selected by the user. In this case the user, preferably, pops up on the automation node and selects the first automation class from a list of previously selected automation classes in the pop-up menu as shown in FIG. 28, or from a list of the automation classes in the system as shown in FIG. 9. In another case, the automation class of the automation node is propagated to the automation node from another automation node as described in FIG. 20 or FIG. 24.

In response to the user selecting a method/property for the automation node, the automation node selects the user-selected method/property to be invoked by the automation node in step 202. The automation node displays the selected method/property in the automation node.

In step 204, the class of the automation node is changed to be of a second automation class in response to user input. Preferably, the user input may be of three different types.

The first type of user input is the user wiring the refnum input terminal of the automation node to the refnum output terminal of second automation node, such as an automation open node, automation property node, or automation invoke node. The second automation node propagates its automation class, i.e., a second automation class, to the automation node, as described in the flowchart of FIG. 20. The second automation class may or may not be different from the first automation class, i.e., from the automation class of the automation node prior to the wiring.

The second type of user input is changing the automation class of a second automation node, whose refnum output terminal is already wired to the refnum input terminal of the automation node, from the first automation class to the second automation class. As in the first type of user input, the second automation node propagates its automation class, i.e., the second automation class, to the automation node, as described in the flowchart of FIG. 24.

The third type of user input is the user selecting the second automation class from a list of automation classes directly, preferably, via either the pop-up menu of the automation node as shown in FIG. 9, or the browse list as shown in FIG. 10. When the user selects a new automation class from one of the two lists of classes, the automation node changes its class to the newly selected second automation class.

In response to the user changing the automation node to be of the second automation class, the automation node performs type propagation checking to determine if the method/property is valid for the second automation class, in step 206. The automation node makes this determination in step 208. Performing the type propagation checking of step 206 will be described in more detail below with reference to FIG. 31.

If the method/property of the automation node is valid for the second automation class, the block diagram editor 64 displays an indication of a valid condition, in step 214.

In the case that the automation node is an automation invoke node, for the first and second types of user input, the indication of a valid condition preferably includes displaying a valid wire. In one embodiment, a valid wire is a solid wire. For the third type of user input, the indication of a valid condition preferably includes displaying at least a portion of the automation invoke node in a color which indicates a valid condition. In one embodiment, a color which indicates a valid condition includes a color for each terminal of the method which indicates the data type of the terminal, wherein the color is not a color which indicates an invalid condition. In one embodiment, the color which indicates an invalid condition is black.

In the case that the automation node is an automation property node the indication of a valid condition preferably includes displaying the property in a color indicative of a valid condition. In one embodiment, a color which indicates a valid condition includes a color for each property which indicates the data type of the property, wherein the color is not a color which indicates an invalid condition. In one embodiment, the color which indicates an invalid condition is black.

If the method/property of the automation node is not valid for the second automation class, the block diagram editor 64 displays an indication of an invalid condition, in step 210.

Figure 29:
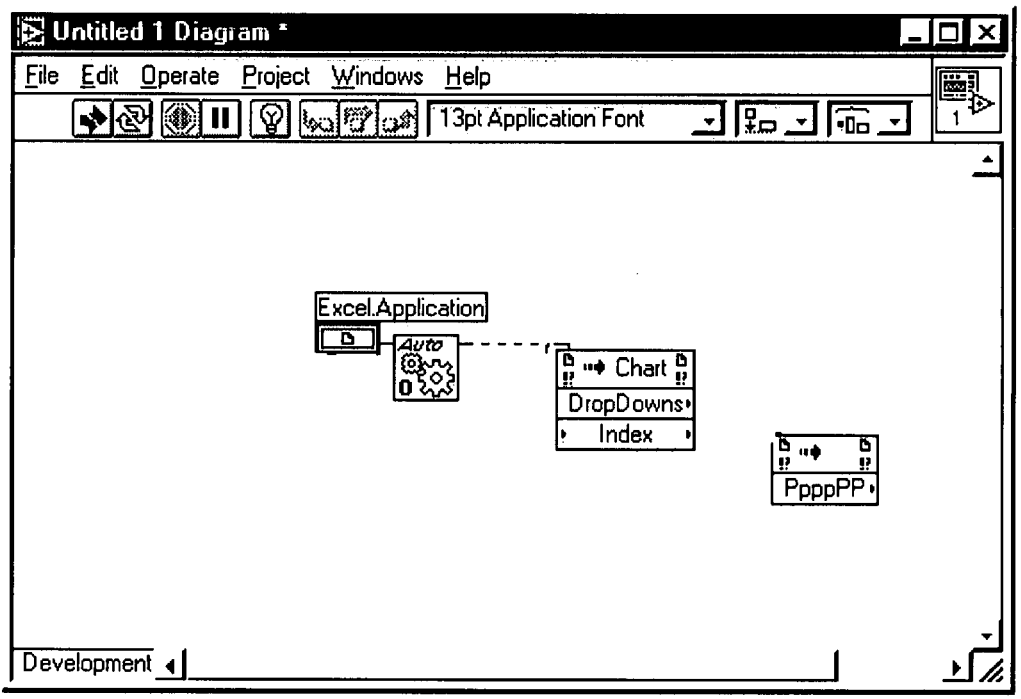

In the case that the automation node is an automation invoke node, for the first and second types of user input, the indication of an invalid condition preferably includes displaying a broken wire. In one embodiment, a broken wire is a dashed wire, as shown in FIG. 29. For the third type of user input, the indication of an invalid condition preferably includes displaying at least a portion of the automation invoke node in a color which indicates an invalid condition. In one embodiment, a color which indicates an invalid condition is black.

In the case that the automation node is an automation property node the indication of an invalid condition preferably includes displaying at least a portion of the automation property node in a color which indicates an invalid condition. In one embodiment, a color which indicates an invalid condition is black.

In the case where the automation node is an automation property node, the type propagation includes performing steps 208, 210 and 214 for each of the properties of the automation property node.

Figure 30:
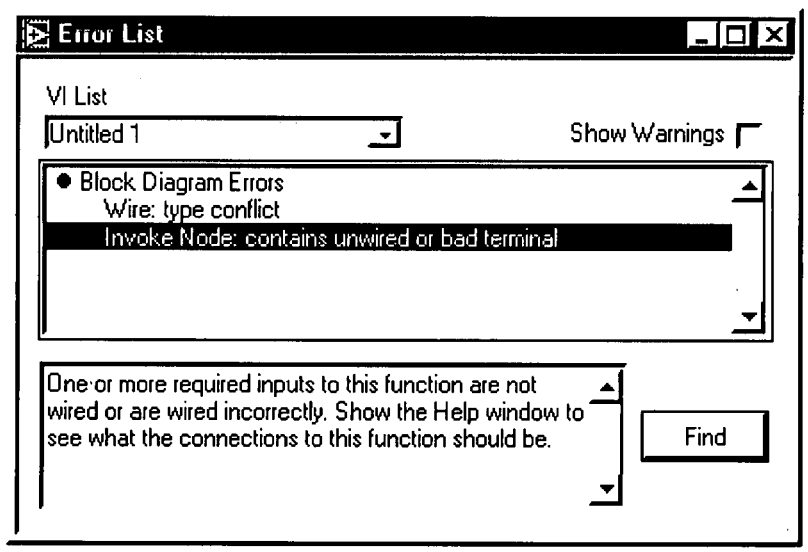

If the method/property of the automation node is not valid for the second automation class, the block diagram editor 64 further displays an error message in an error window, as shown in FIG. 30, in step 212. In one embodiment, if the method/property of the automation node is not valid for the second automation class, the graphical programming environment prevents execution of the virtual instrument, in step 214. That is the graphical programming environment prevents the automation node from invoking the associated method/property.

Figure 31:
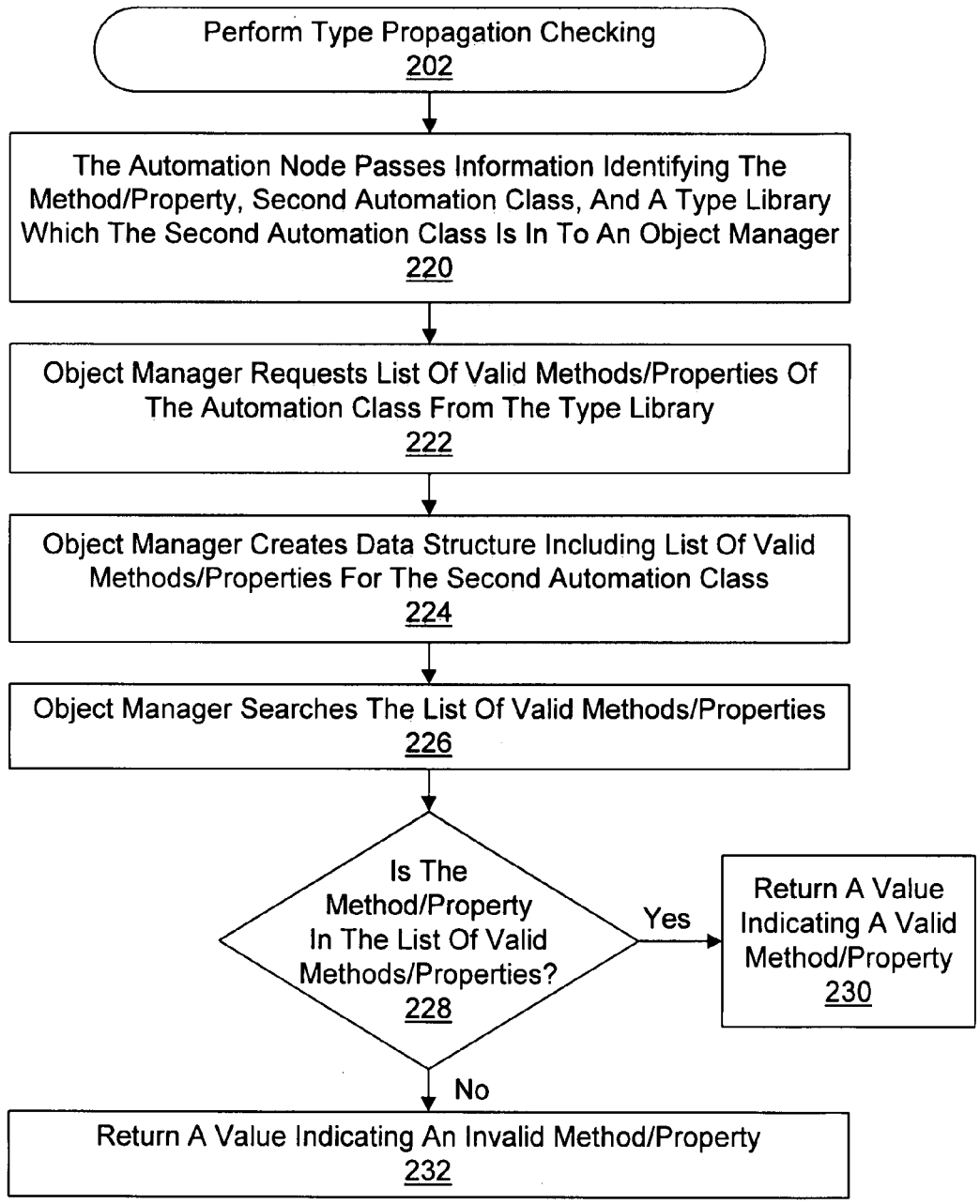
FIG. 31 is a flowchart illustrating in more detail the step of FIG. 27 of performing type propagation.

Referring now to FIG. 31, a flowchart illustrating in more detail the step 206 of FIG. 27 of performing type propagation is shown. In response to the user changing the automation node to be of the second automation class, the automation node passes information to the object manager 68 (of FIG. 3) in step 220. The information passed includes information identifying the method/property of the automation node, information identifying the second automation class, and information identifying a type library, of the type libraries 70 (of FIG. 3), which the second automation class is in. Preferably, the automation node invokes a function of the object manager 68 which returns a value indicating whether or not the method/property is a valid method/property for the second automation class, i.e., whether or not the second automation class defines the method/property. Preferably, the automation node receives the information in a type descriptor, described above, via the refnum input terminal of the automation node.

In response to the automation node passing the information to the object manager 68, the object manager 68 requests a list of valid methods/properties of the second automation class from the type library specified in the passed information in step 222. The type library includes information specifying the methods and properties defined by each class in the type library.

The type library returns the requested list and the object manager 68 receives the requested list from the type library and creates a data structure including the list of valid methods/properties of the second automation class in step 224.

In one embodiment, the object manager 68 maintains the data structure created and determines in response to step 220 whether or not the list of valid methods/properties exists. If the list already exists, the object manager 68 does not perform step 222.

The object manager 68 searches the list of valid methods/properties in the data structure in step 226 and determines if the method/property is valid, i.e., present in the list, in step 228. If the specified method/property is present in the list of valid methods/properties, the object manager 68 returns a value indicating a valid method/property in step 230. If the specified method/property is not present in the list of valid methods/properties, the object manager 68 returns a value indicating an invalid method/property in step 232.

Figure 32:
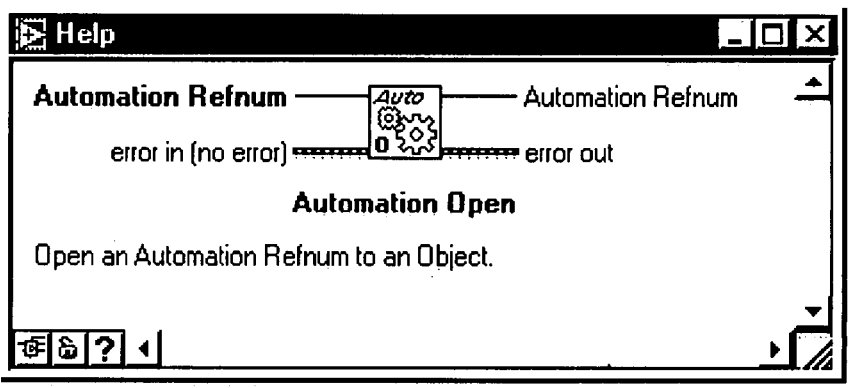
FIGS. 32, 33 and 34 are screen shots illustrating a help screen for an automation open node, an automation property node, and an automation invoke node, respectively.
Figure 33:
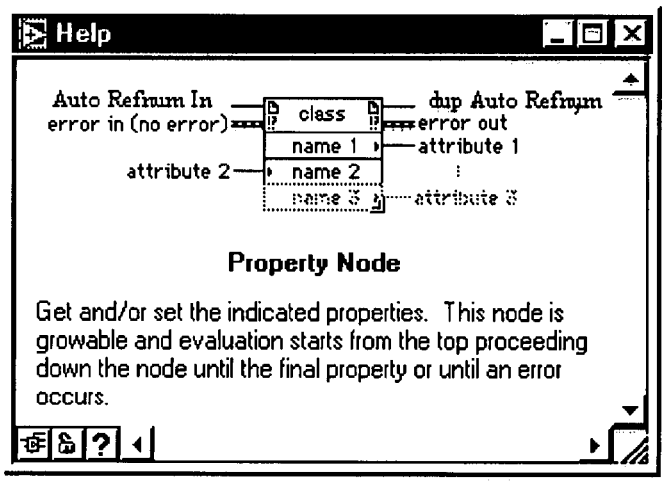
Figure 34:
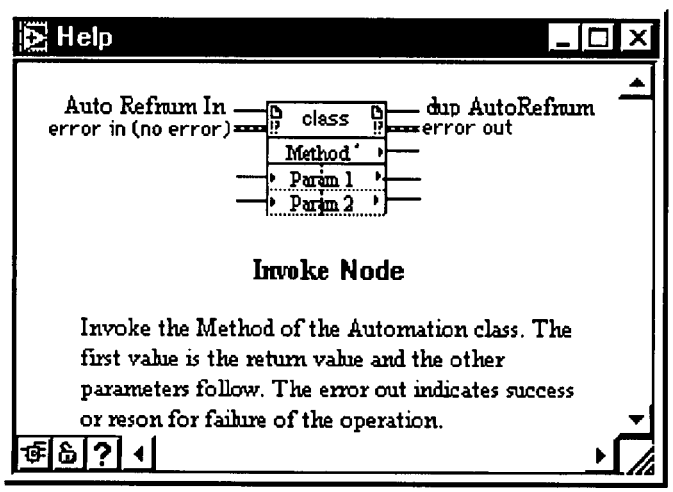

FIGS. 32, 33 and 34 are screen shots illustrating a help screen for an automation open node, an automation property node, and an automation invoke node, respectively. The help screens illustrate the various terminals of the automation nodes.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

The invention claimed is:

1. A computer-implemented method for creating a graphical data flow program, wherein the graphical data flow program is configured to invoke a method of an object, wherein the method for creating the graphical data flow program operates in a computer including a display and a user input device, the method for creating the graphical data flow program comprising:
displaying on the screen a node in the graphical data flow program in response to user input, wherein the node is configured to invoke a method of an object, wherein the graphical data flow program comprises a plurality of interconnected nodes which visually indicate functionality of the graphical data flow program, wherein the plurality of interconnected nodes are connected by lines which represent flow of data among the nodes;
configuring the node to receive information on the object in response to user input, wherein said configuring comprises connecting the information on the object to an input of the node;
wherein the node is configured to invoke the method of the object during execution of the graphical data flow program.

2. The computer-implemented method of claim 1, wherein the node includes an object reference input for receiving a reference to the object;
wherein said configuring comprises connecting said object reference input of the node to receive the reference to the object;
wherein the node receives the information on the object on the object reference input during execution of the graphical data flow program.

3. The computer-implemented method of claim 2, wherein said configuring comprises:
displaying on the screen an object reference node which includes an object reference output that provides the reference to the object; and
connecting the object reference output of the object reference node to the object reference input of the node.

4. The computer-implemented method of claim 3, further comprising:
executing the graphical data flow program, wherein said executing includes propagating the reference to the object from the object reference output of the object reference node to the object reference input of the node.

5. The computer-implemented method of claim 1, further comprising:
executing the graphical data flow program, wherein said executing includes propagating the information on the object to the node.

6. The computer-implemented method of claim 1, wherein the object is comprised in a server, wherein said configuring comprises:
displaying on the screen a list of libraries associated with one or more servers;
selecting a library from the list of libraries in response to user input;
displaying on the screen a list of possible classes from the selected library;
selecting a class from the list of possible classes in response to user input;
wherein the object is instantiated from the class.

7. The computer-implemented method of claim 1, further comprising:
constructing execution instructions in response to the graphical data flow program, wherein the execution instructions are executable to invoke the method of the object; and
executing said execution instructions, wherein the node invokes the method of the object during said executing.

8. The computer-implemented method of claim 7, wherein said executing includes propagating the information on the object to the node.

9. The computer-implemented method of claim 1, wherein the graphical data flow program is configured to invoke the method of the object for performing instrumentation functions on an instrument.

10. The computer-implemented method of claim 1, wherein the graphical data flow program includes a block diagram and a front panel, wherein the block diagram includes the node.

11. A computer-implemented method for creating a graphical data flow program, wherein the graphical data flow program is configured to invoke a property of an object, wherein the method for creating the graphical data flow program operates in a computer including a display screen and a user input device, the method for creating the graphical data flow program comprising:
displaying on the screen a node in the graphical data flow program in response to user input, wherein the node is configured to invoke a property of an object, wherein the graphical data flow program comprises a plurality of interconnected nodes which visually indicate functionality of the graphical data flow program, wherein the plurality of interconnected nodes are connected by lines which represent flow of data among the nodes;
configuring the node to receive information on the object in response to user input;
wherein the node is configured to invoke the property of the object during execution of the graphical data flow program.

12. The computer-implemented method of claim 11, wherein the node includes an object reference input for receiving a reference to the object;
wherein said configuring comprises connecting the object reference input of the node to receive the reference to the object;
wherein the node receives the information on the object on the object reference input during execution of the graphical data flow program.

13. The computer-implemented method of claim 12, wherein said configuring comprises:
displaying on the screen an object reference node which includes an object reference output that provides the reference to the object; and
connecting the object reference output of the object reference node to the object reference input of the node.

14. The computer-implemented method of claim 13, further comprising:
executing the graphical data flow program, wherein said executing includes propagating the reference to the object from the object reference output of the object reference node to the object reference input of the node.

15. The computer-implemented method of claim 11, further comprising:
executing the graphical data flow program, wherein said executing includes providing the information on the object to the node.

16. The computer-implemented method of claim 11, wherein the object is comprised in a server, wherein said configuring comprises:
displaying on the screen a list of libraries associated with one or more servers;
selecting a library from the list of libraries in response to user input displaying on the screen a list of possible classes from the selected library;

selecting a class from the list of possible classes in response to user input;
wherein the object is instantiated from the class.

17. The computer-implemented method of claim 11, further comprising:
constructing execution instructions in response to the graphical data flow program, wherein the execution instructions are executable to invoke the property of the object; and
executing said execution instructions, wherein the node invokes the property of the object during said executing.

18. The computer-implemented method of claim 11, wherein the node is configured to get and/or set one or more properties of the object.

19. The computer-implemented method of claim 11, wherein the graphical data flow program is configured to invoke the property of the object for performing instrumentation functions on an instrument.

20. The computer-implemented method of claim 11, wherein the graphical data flow program includes a block diagram and a front panel, wherein the block diagram includes the node.

21. A non-transitory memory medium comprising program instructions for creating a graphical data flow program, wherein the graphical data flow program is configured to invoke a method of an object, wherein the program instructions are executable to:
display on the screen a node in the graphical data flow program in response to user input, wherein the node is configured to invoke a method of an object, wherein the graphical data flow program comprises a plurality of interconnected nodes which visually indicate functionality of the graphical data flow program, wherein the plurality of interconnected nodes are connected by lines which represent flow of data among the nodes;
configure the node to receive information on the object in response to user input, wherein said configuring comprises connecting the information on the object to an input of the node;
wherein the node is configured to invoke the method of the object during execution of the graphical data flow program.

22. The non-transitory memory medium of claim 21, wherein the node includes an object reference input for receiving a reference to the object;
wherein said configuring comprises connecting the object reference input of the node to receive the reference to the object;
wherein the node receives the information on the object on the object reference input during execution of the graphical data flow program.

23. The non-transitory memory medium of claim 22, wherein said configuring comprises:
displaying on the screen an object reference node which includes an object reference output that provides the reference to the object; and
connecting the object reference output of the object reference node to the object reference input of the node.

24. The non-transitory memory medium of claim 23, wherein the program instructions are further executable to:
execute the graphical data flow program, wherein said executing includes propagating the reference to the object from the object reference output of the object reference node to the object reference input of the node.

25. The non-transitory memory medium of claim 21, wherein the program instructions are further executable to:
construct execution instructions in response to the graphical data flow program, wherein the execution instructions are executable to invoke the method of the object; and
execute said execution instructions, wherein the node invokes the method of the object during said executing.

26. The non-transitory memory medium of claim 25, wherein said executing includes propagating the information on the object to the node.

27. The non-transitory memory medium of claim 21, wherein the graphical data flow program is configured to invoke the method of the object for performing instrumentation functions on an instrument.

28. The non-transitory memory medium of claim 21, wherein the graphical data flow program includes a block diagram and a front panel, wherein the block diagram includes the node.

29. A non-transitory memory medium comprising program instructions for creating a graphical data flow program, wherein the graphical data flow program is configured to invoke a property of an object, wherein the program instructions are executable to:
display on the screen a node in the graphical data flow program in response to user input, wherein the node is configured to invoke a property of an object, wherein the graphical data flow program comprises a plurality of interconnected nodes which visually indicate functionality of the graphical data flow program, wherein the plurality of interconnected nodes are connected by lines which represent flow of data among the nodes;
configure the node to receive information on the object in response to user input;
wherein the node is configured to invoke the property of the object during execution of the graphical data flow program.

30. The non-transitory memory medium of claim 29, wherein the node includes an object reference input for receiving a reference to the object;
wherein said configuring comprises connecting the object reference input of the node to receive the reference to the object;
wherein the node receives the information on the object on the object reference input during execution of the graphical data flow program.

31. The non-transitory memory medium of claim 30, wherein said configuring comprises:
displaying on the screen an object reference node which includes an object reference output that provides the reference to the object; and
connecting the object reference output of the object reference node to the object reference input of the node.

32. The non-transitory memory medium of claim 31, wherein the program instructions are further executable to:
execute the graphical data flow program, wherein said executing includes propagating the reference to the object from the object reference output of the object reference node to the object reference input of the node.

33. The non-transitory memory medium of claim 29, wherein the program instructions are further executable to:
construct execution instructions in response to the graphical data flow program, wherein the execution instructions are executable to invoke the property of the object; and
execute said execution instructions, wherein the node invokes the property of the object during said executing.

34. The non-transitory memory medium of claim 29, wherein the node is configured to get and/or set one or more properties of the object.

35. The non-transitory memory medium of claim 29, wherein the graphical data flow program is configured to invoke the property of the object for performing instrumentation functions on an instrument.

36. The non-transitory memory medium of claim 29, wherein the graphical data flow program includes a block diagram and a front panel, wherein the block diagram includes the node.

37. A non-transitory memory medium which stores a graphical data flow program;
wherein the graphical data flow program comprises a plurality of interconnected nodes which visually indicate functionality of the graphical data flow program, wherein the plurality of interconnected nodes are connected by lines which represent flow of data among the nodes, and wherein the graphical data flow program includes a node which is configured to invoke a method of an object;
wherein the node includes an input which is configurable to receive information on the object in response to user input;
wherein the node is configured to invoke the method of the object during execution of the graphical data flow program.

38. A non-transitory memory medium which stores a graphical data flow program;
wherein the graphical data flow program comprises a plurality of interconnected nodes which visually indicate functionality of the graphical data flow program, wherein the plurality of interconnected nodes are connected by lines which represent flow of data among the nodes, and wherein the graphical data flow program includes a node which is configured to invoke a property of an object;
wherein the node includes an input which is configurable to receive information on the object in response to user input;
wherein the node is configured to invoke the property of the object during execution of the graphical data flow program.

39. A computer-implemented method for creating a graphical data flow program, the method for creating the graphical data flow program comprising:
utilizing a computer to perform:
displaying on a display a graphical data flow program, wherein the graphical data flow program comprises a plurality of interconnected nodes which visually indicate functionality of the graphical data flow program, wherein the plurality of interconnected nodes are connected by lines which represent flow of data among the nodes;
displaying on the display a node in the graphical data flow program in response to user input, wherein the node is configurable to invoke a method of any of a plurality of software objects;
connecting the node to one or more other nodes in the graphical data flow program in response to user input;
configuring the node to receive information on a first object in response to user input;
wherein the node is configured to invoke a method of the first object during execution of the graphical data flow program.

40. The computer-implemented method of claim 39, wherein the lines interconnecting the plurality of nodes indicate that data produced by one node is used by another node.

41. The computer-implemented method of claim 39, wherein said configuring comprises connecting the information on the first object to an input of the node.

42. The computer-implemented method of claim 39, wherein said configuring comprises:
displaying on the screen a list of libraries associated with one or more servers;
selecting a library from the list of libraries in response to user input;
displaying on the screen a list of possible classes from the selected library;
selecting a class from the list of possible classes in response to user input;
wherein the first object is instantiated from the class.

43. The computer-implemented method of claim 39, further comprising:
utilizing the computer to perform:
constructing execution instructions in response to the graphical data flow program, wherein the execution instructions are executable to invoke the method of the first object; and
executing said execution instructions, wherein the node invokes the method of the first object during said executing.

44. The computer-implemented method of claim 39, further comprising:
utilizing the computer to perform:
configuring the node to receive information on a first method of the first object in response to user input;
wherein the node is configured to invoke the first method of the first object during execution of the graphical data flow program.

45. The computer-implemented method of claim 39, wherein said configuring the node to receive information on a first object comprises configuring the node to receive information on a first class of the first object, wherein the first object is instantiated from the first class.

46. A non-transitory memory medium comprising program instructions for creating a graphical data flow program, wherein the program instructions are executable to implement:
displaying on a display a graphical data flow program, wherein the graphical data flow program comprises a plurality of interconnected nodes which visually indicate functionality of the graphical data flow program, wherein the plurality of interconnected nodes are connected by lines which represent flow of data among the nodes;
displaying on the display a node in the graphical data flow program in response to user input, wherein the node is configurable to invoke a method of any of a plurality of software objects;
connecting the node to one or more other nodes in the graphical data flow program in response to user input;
configuring the node to receive information on a first object in response to user input;
wherein the node is configured to invoke a method of the first object during execution of the graphical data flow program.

47. The non-transitory memory medium of claim 46, wherein the lines interconnecting the plurality of nodes indicate that data produced by one node is used by another node.

48. The non-transitory memory medium of claim 46,
wherein said configuring comprises connecting the information on the first object to an input of the node.

49. The non-transitory memory medium of claim 46, wherein said configuring comprises:
displaying on the screen a list of possible classes;
selecting a class from the list of possible classes in response to user input;
wherein the first object is instantiated from the class.

50. The non-transitory memory medium of claim 46, wherein said configuring comprises:
displaying on the screen a list of libraries associated with one or more servers;
selecting a library from the list of libraries in response to user input;
displaying on the screen a list of possible classes from the selected library;
selecting a class from the list of possible classes in response to user input;
wherein the first object is instantiated from the class.

51. The non-transitory memory medium of claim 46, wherein the program instructions are further executable to implement:
constructing execution instructions in response to the graphical data flow program, wherein the execution instructions are executable to invoke the method of the first object; and
executing said execution instructions, wherein the node invokes the method of the first object during said executing.

52. The non-transitory memory medium of claim 46, wherein the program instructions are further executable to implement:
configuring the node to receive information on a first method of the first object in response to user input;
wherein the node is configured to invoke the first method of the first object during execution of the graphical data flow program.

53. The non-transitory memory medium of claim 46,
wherein said configuring the node to receive information on a first object comprises configuring the node to receive information on a first class of the first object, wherein the first object is instantiated from the first class.

54. A computer-implemented method for creating a graphical data flow program, the method for creating the graphical data flow program comprising:
utilizing a computer to perform:
displaying on a display a graphical data flow program, wherein the graphical data flow program comprises a plurality of interconnected nodes which visually indicate functionality of the graphical data flow program, wherein the plurality of interconnected nodes are connected by lines which represent flow of data among the nodes;
displaying on the display a node in the graphical data flow program in response to user input, wherein the node is configurable to perform at least one of getting or setting at least one property of any of a plurality of software objects;
connecting the node to one or more other nodes in the graphical data flow program in response to user input;
configuring the node to receive information on a first object in response to user input;
wherein the node is configured to perform at least one of getting or setting at least one property of the first object during execution of the graphical data flow program.

55. The computer-implemented method of claim 54,
wherein the lines interconnecting the plurality of nodes indicate that data produced by one node is used by another node.

56. The computer-implemented method of claim 54,
wherein said configuring comprises connecting the information on the first object to an input of the node.

57. The computer-implemented method of claim 54, wherein said configuring comprises:
displaying on the screen a list of libraries associated with one or more servers;
selecting a library from the list of libraries in response to user input;
displaying on the screen a list of possible classes from the selected library;
selecting a class from the list of possible classes in response to user input;
wherein the first object is instantiated from the class.

58. The computer-implemented method of claim 54, further comprising:
utilizing the computer to perform:
constructing execution instructions in response to the graphical data flow program, wherein the execution instructions are executable to perform at least one of getting or setting at least one property of the first object; and
executing said execution instructions, wherein the node performs at least one of getting or setting at least one property of the first object during said executing.

59. The computer-implemented method of claim 54, further comprising:
utilizing the computer to perform:
configuring the node to receive information on a first property of the first object in response to user input;
wherein the node is configured to perform at least one of getting or setting at least one property of the first object during execution of the graphical data flow program.

60. The computer-implemented method of claim 54,
wherein said configuring the node to receive information on a first object comprises configuring the node to receive information on a first class of the first object, wherein the first object is instantiated from the first class.

61. A non-transitory memory medium comprising program instructions for creating a graphical data flow program, wherein the program instructions are executable to implement:
displaying on a display a graphical data flow program, wherein the graphical data flow program comprises a plurality of interconnected nodes which visually indicate functionality of the graphical data flow program, wherein the plurality of interconnected nodes are connected by lines which represent flow of data among the nodes;
displaying on the display a node in the graphical data flow program in response to user input, wherein the node is configurable to perform at least one of getting or setting at least one property of any of a plurality of software objects;
connecting the node to one or more other nodes in the graphical data flow program in response to user input;
configuring the node to receive information on a first object in response to user input;
wherein the node is configured to perform at least one of getting or setting at least one property of the first object during execution of the graphical data flow program.

62. The non-transitory memory medium of claim 61,
wherein the lines interconnecting the plurality of nodes indicate that data produced by one node is used by another node.

63. The non-transitory memory medium of claim 61,
wherein said configuring comprises connecting the information on the first object to an input of the node.

64. The non-transitory memory medium of claim 61, wherein said configuring comprises:
displaying on the screen a list of possible classes;
selecting a class from the list of possible classes in response to user input;
wherein the first object is instantiated from the class.

65. The non-transitory memory medium of claim 61, wherein said configuring comprises:
displaying on the screen a list of libraries associated with one or more servers;
selecting a library from the list of libraries in response to user input;
displaying on the screen a list of possible classes from the selected library;
selecting a class from the list of possible classes in response to user input;
wherein the first object is instantiated from the class.

66. The non-transitory memory medium of claim 61, wherein the program instructions are further executable to implement:
constructing execution instructions in response to the graphical data flow program, wherein the execution instructions are executable to perform at least one of getting or setting at least one property of the first object; and
executing said execution instructions, wherein the node performs at least one of getting or setting at least one property of the first object during said executing.

67. The non-transitory memory medium of claim 61, wherein the program instructions are further executable to implement:
configuring the node to receive information on a first method of the first object in response to user input;
wherein the node is configured to perform at least one of getting or setting at least one property of the first object during execution of the graphical data flow program.

68. The non-transitory memory medium of claim 61,
wherein said configuring the node to receive information on a first object comprises configuring the node to receive information on a first class of the first object, wherein the first object is instantiated from the first class.

69. A non-transitory memory medium comprising program instructions for creating a graphical data flow program, wherein the program instructions are executable to implement:
displaying on a display a graphical data flow program, wherein the graphical data flow program comprises a plurality of interconnected nodes which visually indicate functionality of the graphical data flow program, wherein the plurality of interconnected nodes are connected by lines which represent flow of data among the nodes;
displaying on the display a node in the graphical data flow program in response to user input, wherein the node is configurable to invoke a method of a software object instantiated from any of a plurality of software classes;
connecting the node to one or more other nodes in the graphical data flow program in response to user input;
configuring the node to receive information on a first class in response to user input;
wherein the node is configured to invoke a method of a first object instantiated from the first class during execution of the graphical data flow program.

70. The non-transitory memory medium of claim 69,
wherein the lines interconnecting the plurality of nodes indicate that data produced by one node is used by another node.

71. The non-transitory memory medium of claim 69,
wherein said configuring comprises connecting the information on the first class to an input of the node.

72. The non-transitory memory medium of claim 69, wherein said configuring comprises:
displaying on the screen a list of possible classes; and
selecting the first class from the list of possible classes in response to user input.

73. The non-transitory memory medium of claim 69, wherein said configuring comprises:
displaying on the screen a list of libraries associated with one or more servers;
selecting a library from the list of libraries in response to user input;
displaying on the screen a list of possible classes from the selected library; and
selecting the first class from the list of possible classes in response to user input.

74. The non-transitory memory medium of claim 69, wherein the program instructions are further executable to implement:
constructing execution instructions in response to the graphical data flow program, wherein the execution instructions are executable to invoke the method of the first object; and
executing said execution instructions, wherein the node invokes the method of the first object during said executing.

75. The non-transitory memory medium of claim 69, wherein the program instructions are further executable to implement:
configuring the node to receive information on a first method of the first class in response to user input;
wherein the node is configured to invoke the first method of the first object instantiated from the first class during execution of the graphical data flow program.

76. A non-transitory memory medium comprising program instructions for creating a graphical data flow program, wherein the program instructions are executable to implement:
displaying on a display a graphical data flow program, wherein the graphical data flow program comprises a plurality of interconnected nodes which visually indicate functionality of the graphical data flow program, wherein the plurality of interconnected nodes are connected by lines which represent flow of data among the nodes;
displaying on the display a node in the graphical data flow program in response to user input, wherein the node is configurable to perform at least one of getting or setting at least one property of a software object instantiated from any of a plurality of software classes;
connecting the node to one or more other nodes in the graphical data flow program in response to user input;
configuring the node to receive information on a first class in response to user input;
wherein the node is configured to perform at least one of getting or setting at least one property of a first object instantiated from the first class during execution of the graphical data flow program.

77. The non-transitory memory medium of claim 76, wherein the lines interconnecting the plurality of nodes indicate that data produced by one node is used by another node.

78. The non-transitory memory medium of claim 76, wherein said configuring comprises connecting the information on the first class to an input of the node.

79. The non-transitory memory medium of claim 76, wherein said configuring comprises:
 displaying on the screen a list of possible classes;
 selecting the first class from the list of possible classes in response to user input.

80. The non-transitory memory medium of claim 76, wherein said configuring comprises:
 displaying on the screen a list of libraries associated with one or more servers;
 selecting a library from the list of libraries in response to user input;
 displaying on the screen a list of possible classes from the selected library;
 selecting the first class from the list of possible classes in response to user input.

81. The non-transitory memory medium of claim 76, wherein the program instructions are further executable to implement:
 constructing execution instructions in response to the graphical data flow program, wherein the execution instructions are executable to perform at least one of getting or setting at least one property of the first object; and
 executing said execution instructions, wherein the node performs at least one of getting or setting at least one property of the first object during said executing.

82. The non-transitory memory medium of claim 76, wherein the program instructions are further executable to implement:
 configuring the node to receive information on a first property of the first class in response to user input;
 wherein the node is configured to perform at least one of getting or setting the first property of the first object instantiated from the first class during execution of the graphical data flow program.

\* \* \* \* \*